United States Patent
Hippelainen et al.

(10) Patent No.: US 10,237,279 B2
(45) Date of Patent: Mar. 19, 2019

(54) ENHANCING INTEGRITY OF DATA CENTER SPECIFIC INFORMATION

(71) Applicant: NOKIA SOLUTIONS AND NETWORKS OY, Espoo (FI)

(72) Inventors: Leo Tapani Hippelainen, Helsinki (FI); Ian Justin Oliver, Söderkulla (FI); Shankar Lal, Espoo (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 15/891,536

(22) Filed: Feb. 8, 2018

(65) Prior Publication Data

US 2018/0227311 A1 Aug. 9, 2018

(30) Foreign Application Priority Data

Feb. 8, 2017 (FI) ...................... 20175111

(51) Int. Cl.
 *H04L 29/06* (2006.01)
 *G06F 21/64* (2013.01)
 (Continued)

(52) U.S. Cl.
 CPC ............ *H04L 63/107* (2013.01); *G06F 21/34* (2013.01); *G06F 21/602* (2013.01); *G06F 21/62* (2013.01);
 (Continued)

(58) Field of Classification Search
 CPC .......... G06F 21/34; G06F 21/62; G06F 21/64; G06F 21/602; G06F 9/45558; H04L 63/107; H04L 9/0877; H04L 9/0825
 See application file for complete search history.

(56) References Cited

U.S. PATENT DOCUMENTS 7,428,754 B2 * 9/2008 Neumann ............... G06F 21/32
 380/280
7,822,549 B2 10/2010 Itzhak
 (Continued)

FOREIGN PATENT DOCUMENTS

WO WO 2013/101094 A1 7/2013

OTHER PUBLICATIONS

Nicolae Paladi et al. "Trusted Geolcation Aware Data Placement in Infrastructure Clouds" IEEE 13th International Conference on Trust, Security, and Privacy in Computing COmmunications (TrustCom) Sep. 24-26, 2014 (9 pages) https://pdfs.semanticscholar.org/4740/3b73c611403ca3a3f523817536022d05660e.pdf.*
 (Continued)

*Primary Examiner* — Joseph P Hirl
*Assistant Examiner* — Thomas A Gyorfi
(74) *Attorney, Agent, or Firm* — Squire Patton Boggs (US) LLP

(57) ABSTRACT

There is provided a method comprising: receiving, by an apparatus of a data center, a request message from a server computer of said data center, the apparatus and the server computer being physically separate entities communicatively coupled with each other, said message requesting data center specific information stored into a read-only memory area of the apparatus; initiating deciphering of the request message in response to receiving the request message; and as a response to successfully deciphering the request message, transmitting a response message to the server computer, said message comprising the data center specific information acquired from the read-only memory area of the apparatus.

17 Claims, 9 Drawing Sheets

(51) Int. Cl.
| | |
|---|---|
| G06F 21/62 | (2013.01) |
| G06F 21/60 | (2013.01) |
| G06F 21/34 | (2013.01) |
| H04L 9/08 | (2006.01) |
| H04W 4/02 | (2018.01) |
| H04W 12/10 | (2009.01) |
| G06F 9/455 | (2018.01) |

(52) U.S. Cl.
CPC ............ *G06F 21/64* (2013.01); *H04L 9/0825* (2013.01); *H04L 9/0872* (2013.01); *H04L 9/0877* (2013.01); *H04L 63/062* (2013.01); *H04W 4/02* (2013.01); *H04W 12/10* (2013.01); *G06F 9/45558* (2013.01)

(56) References Cited

U.S. PATENT DOCUMENTS

| | | | | |
|---|---|---|---|---|
| 8,181,262 | B2* | 5/2012 | Cooper | H04K 1/00 709/223 |
| 9,258,331 | B2 | 2/2016 | Dyer et al. | |
| 9,374,228 | B2 | 6/2016 | Pendarakis et al. | |
| 9,524,370 | B2* | 12/2016 | Raisaro | G06F 19/322 |
| 2008/0209515 | A1 | 8/2008 | Ibrahim et al. | |
| 2015/0082399 | A1 | 3/2015 | Wu et al. | |
| 2015/0264024 | A1 | 9/2015 | Frank | |
| 2015/0379292 | A1 | 12/2015 | Lewis | |
| 2016/0065589 | A1 | 3/2016 | Leighton et al. | |
| 2016/0173454 | A1 | 6/2016 | Statchuk | |

OTHER PUBLICATIONS

Arthur W., Challener D., Goldman K. (2015) Platform Configuration Registers. In: A Practical Guide to TPM 2.0. Apress, Berkeley, CA, published Jan. 23, 2015 (14 pages) https://link.springer.com/chapter/10.1007/978-1-4302-6584-9_12.*

Communication of Acceptance dated Oct. 19, 2017 corresponding to Finnish Patent Application No. 20175111.

Search Report dated May 18, 2017 corresponding to Finnish Patent Application No. 20175111.

Leo Hippelainen et al., "Survey of Cloud Server Geolocating Techniques," Proceeding of the 19th Conference of Fruct Association, Finland: IEEE [online], Nov. 2016, pp. 54-65.

Michael Bartock et al., "Trusted Geolocation in the Cloud: Proof of Concept Implementation," National Institute of Standards and Technology (NIST) [online], Dec. 2015.

Dong Lai Fu et al., "Trusted Validation for Geolocation of Cloud Data," The Computer Journal. The British Computer Society [online] Dec. 15, 2014, vol. 58, No. 10.

Wikipedia, Cloud computing, https://en.wikipedia.org/wiki/Cloud_computing.

Der-Yeuan Yu et al, SALVE: Server Authentication with Location Verification, Aug. 16, 2016, 14 pages.

International Search Report & Written Opinion dated May 29, 2018 corresponding to International Patent Application No. PCT/EP2018/053134.

* cited by examiner

ENHANCING INTEGRITY OF DATA CENTER SPECIFIC INFORMATION

TECHNICAL FIELD

The invention relates to computing. Particularly, the present invention relates to secure cloud computing.

BACKGROUND

In modern cloud based computing systems, physical location of data has become less relevant from the user's perspective. However, it may be sometimes necessary to know the actual physical location of the digital information in its various forms. Hence, there is room for improving the integrity and trustworthiness of physical location associated information, for example.

US2016065589 discloses systems and methods relating to improved security in cloud computing environments. According to one illustrative implementation, a method for provisioning physical geographic location of a physical infrastructure device associated with a hypervisor host is provided. Further, the method may include performing processing to obtain initial geo location data of the device, determining verified geo location data of the device by performing validation, via an attestation service component, of the initial geo location data to provide verified geo location data, and writing the verified geo location data into HSM or TPM space of the hypervisor host.

BRIEF DESCRIPTION

According to an aspect, there is provided a method comprising: receiving, by an apparatus of a data center, a request message from a server computer of said data center, the apparatus and the server computer being physically separate entities communicatively coupled with each other, said message requesting data center specific information stored in a memory area of the apparatus; initiating, by the apparatus, deciphering of the request message in response to receiving the request message; and as a response to successfully deciphering the request message, transmitting, by the apparatus, a response message to the server computer, said message comprising the data center specific information acquired from the memory area of the apparatus, the data center specific information comprising at least one of a jurisdiction identifier, a data center identifier uniquely identifying the data center, and pre-stored geolocation data, the data center specific information being stored in a read-only memory area of the apparatus, the read-only memory being a write once memory area before the data center specific information is stored in said memory, wherein the data center comprises a plurality of server computers each communicatively coupled with the apparatus, the apparatus configured to provide said data center specific information to each of the plurality of server computers.

According to an aspect, there is provided a method comprising: sending, by a server computer of a data center, a ciphered request message to an apparatus of the data center, said message requesting data center specific information from a memory area of said apparatus; as a response to the sending, initiating receiving a response message from the apparatus; in response to receiving the response message comprising the data center specific information, determining a round-trip time, based on the transmitting the request message and the receiving the response message, or determining received signal quality, based on the received response message, the data center specific information comprising at least one of a jurisdiction identifier, a data center identifier uniquely identifying the data center, and pre-stored geolocation data, the data center specific information being stored in a read-only memory area of the apparatus, the read-only memory being a write once memory area before the data center specific information is stored in said memory; and discarding the received data center specific information if the determined round-trip time exceeds a threshold or if the determined received signal quality is equal to or below a threshold.

According to an aspect, there is provided an apparatus comprising: at least one processor; and at least one memory comprising computer program code, wherein the at least one memory and the computer program code are configured, with the at least one processor, to cause the apparatus to perform operations comprising: receiving a request message from a server computer of a data center, the apparatus and the server computer being physically separate entities communicatively coupled with each other, said message requesting data center specific information stored in a memory area of the apparatus; initiating deciphering of the request message in response to receiving the request message; and as a response to successfully deciphering the request message, transmitting a response message to the server computer, said message comprising the data center specific information acquired from the memory area of the apparatus, the data center specific information comprising at least one of a jurisdiction identifier, a data center identifier uniquely identifying the data center, and pre-stored geolocation data, the data center specific information being stored in a read-only memory area of the apparatus, the read-only memory being a write once memory area before the data center specific information is stored in said memory, wherein the data center comprises a plurality of server computers each communicatively coupled with the apparatus, the apparatus configured to provide said data center specific information to each of the plurality of server computers.

According to an aspect, there is provided an apparatus comprising: at least one processor; and at least one memory comprising computer program code, wherein the at least one memory and the computer program code are configured, with the at least one processor, to cause a server computer of a data center to perform operations comprising: sending a ciphered request message to an apparatus of the data center, said message requesting data center specific information from a memory area of said apparatus; as a response to the sending, initiating receiving a response message from the apparatus; in response to receiving the response message comprising the data center specific information, determining a round-trip time, based on the transmitting the request message and the receiving the response message, or determining a received signal quality, based on the received response message, the data center specific information comprising at least one of a jurisdiction identifier, a data center identifier uniquely identifying the data center, and pre-stored geolocation data, the data center specific information being stored in a read-only memory area of the apparatus, the read-only memory being a write once memory area before the data center specific information is stored in said memory; and discarding the received data center specific information if the determined round-trip time exceeds a threshold or if the determined received signal quality is equal to or below a threshold.

According to an aspect, there is provided data center system comprising: at least one apparatus; and at least one server computer, said at least one apparatus and said at least one server computer being physically separate entities communicatively coupled with each other, wherein the at least one apparatus and the at least one server computer are configured to perform operations comprising: sending, by the at least one server computer, a ciphered request message to the at least one apparatus, said message requesting data center specific information from a read-only memory area of said at least one apparatus; receiving, by the at least one apparatus, the request message from the at least one server computer, said message requesting data center specific information stored into a read-only memory area of the at least one apparatus; initiating, by the at least one apparatus, deciphering of the request message in response to receiving the request message; as a response to successfully deciphering the request message, transmitting, by the at least one apparatus, a response message to the at least one server computer, said message comprising the data center specific information acquired from the read-only memory area of the at least one apparatus; as a response to the sending, initiating, by the at least one server computer, receiving a response message from the at least one apparatus; in response to receiving the response message comprising the data center specific information, determining, by the at least one server computer, a round-trip time, based on the transmitting the request message and the receiving the response message, or determining, by the at least one server computer, a received signal quality based on the received response message; and discarding, by the at least one server computer, the received data center specific information if the determined round-trip time exceeds a threshold or if the determined received signal quality is equal to or below a threshold, wherein the data center specific information comprises at least one of a jurisdiction identifier, a data center identifier uniquely identifying the data center, and pre-stored geolocation data, the data center specific information being stored in a read-only memory area of the apparatus, the read-only memory being a write once memory area before the data center specific information is stored in said memory, wherein the data center comprises a plurality of server computers each communicatively coupled with the apparatus, the apparatus configured to provide said data center specific information to each of the plurality of server computers.

Some embodiments are defined in the dependent claims.

One or more examples of implementations are set forth in more detail in the accompanying drawings and the description below. Other features will be apparent from the description and drawings, and from the claims.

BRIEF DESCRIPTION OF DRAWINGS

In the following some embodiments will be described with reference to the attached drawings, in which FIG. 1 illustrates an example system to which embodiments may be applied to;

DETAILED DESCRIPTION OF SOME EMBODIMENTS

Figure 1:
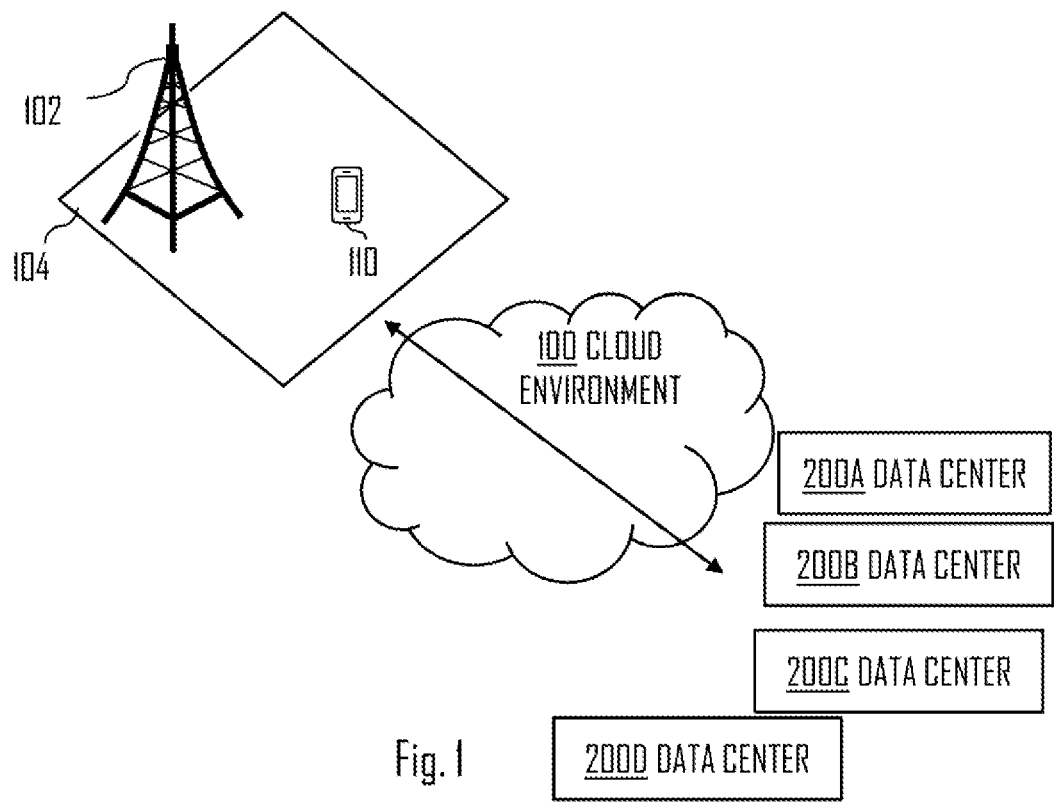

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Embodiments described may be implemented in a radio system, such as in at least one of the following: Worldwide Interoperability for Microwave Access (WiMAX), Global System for Mobile communications (GSM, 2G), GSM EDGE radio access Network (GERAN), General Packet Radio Service (GRPS), Universal Mobile Telecommunication System (UMTS, 3G) based on basic wideband-code division multiple access (W-CDMA), high-speed packet access (HSPA), Long Term Evolution (LTE), and/or LTE-Advanced.

Another example of a suitable communications system is the 5G concept. 5G is likely to use multiple input-multiple output (MIMO) techniques (including MIMO antennas), many more base stations or nodes than the LTE (a so-called small cell concept), including macro sites operating in co-operation with smaller stations and perhaps also employing a variety of radio technologies for better coverage and enhanced data rates. 5G will likely be comprised of more than one radio access technology (RAT), each optimized for certain use cases and/or spectrum. 5G mobile communications will have a wider range of use cases and related applications including video streaming, augmented reality, different ways of data sharing and various forms of machine type applications, including vehicular safety, different sensors and real-time control. 5G is expected to have multiple radio interfaces, namely below 6 GHz, cmWave and mmWave, and also being integradable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility. It should be appreciated that future networks will most probably utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or cloud data storage may also be utilized. In radio communications this may mean node operations to be carried out, at least partly, in a server, host or node operationally coupled to a remote radio head. It is also possible that node operations will be distributed among a plurality of servers, nodes or hosts. It should also be understood that the distribution of labor between core network operations and base station operations may differ from that of the LTE or even be non-existent. Some other technology advancements probably to be used are Software-Defined Networking (SDN), Big Data, and all-IP, which may change the way networks are being constructed and managed.

The embodiments are not, however, restricted to the system given as an example but a person skilled in the art may apply the solution to other communication systems provided with necessary properties. For example, the proposed solution may be utilized basically in any type of system utilizing cloud computing, and which knowing physical location of data may be of importance. One example of a general cloud environment 100 applying system to which the embodiments of the invention may be applied to is shown in FIG. 1. With reference to FIG. 1, computing services are being increasingly provided by using cloud computing also known as on-demand computing, in which a data center or data center(s) 200A-D can consist of a plurality of physical computers (e.g. thousands of computers), each running one or more logical computers also called as virtual machines. The actual service delivering applications may be deployed to the virtual machines. From a user device (e.g. application layer software) point of view each virtual machine looks like a real physical computer. The advantage of such systems includes resource sharing when several virtual machines can run on the same physical server and when virtual machines can be reallocated to another physical server to balance load among them. Load sharing can occur even between data centers 200A-D located around the globe. This allows sharing computing load between data centers and thus further reducing costs.

Such arrangements may require trust between service providers and users. For example, identity of the server computer providing the service may need to be known. Hence, trusted computing may be utilized, which includes trusted hardware and software. Trusted computing can be based on using verified hardware and software and making sure that only verified software is running. Trust can be based on a Hardware Security Module (HSM) being fitted to the server hardware and purchasing the equipment from a trusted supplier. Each HSM may contain a unique secret key, which can be used to identify the computer, into which a HSM is installed. An instantiation of HSM called Trusted Platform Module (TPM) can also be used for verifying software binaries and configuration data before taking them to use at start-up and to provide dependable computer identifier based on its unique seed or root key. The software entities are measured by computing a cryptographic hash over their bytes and values extended to TPM's PCR values. Finally, these values are compared with known good values to check that no unauthorized modifications exist and, consequently, the server can be trusted.

As explained, the physical location of the data centers 200A-D and server computers in the data centers may become less relevant. For example, when a terminal device 110 of a cellular network or system (such as described above) comprising at least one network element 102 providing at least one cell needs to access data of an Internet service, the terminal device 110 may access the Internet service via the cellular network. It needs to be noted that any type of access to said service may be utilized that are known in the art. For example, Local Area Network (LAN) and/or Wireless LAN (WLAN), and the like may be utilized by the user device, such as the terminal device 110 (e.g. mobile phone, tablet computer, laptop, portable electronic device, and the like). For example, the terminal device 110 may store data to the Internet service that utilizes services of one or more data centers 200A-D. For example, images may be stored or downloaded to the server computers of the data centers 200A-D. The problem arising from this is that the terminal device 110 (and the user) may not know to which data center 200A-D the data is stored to or obtained from.

For example, legislation in many countries forbids processing private information of its citizens in jurisdictions that fail to comply with the domestic privacy laws. Preservation of aspects such as data sovereignty, privacy, lawful intercept (LI) may be critically dependent upon physical location of the processing and storage servers. According to many legislations, LI recordings shall not be revealed to unauthorized parties, which may well happen if the data is processed in cloud data center that resides in another country. This applies even between countries inside the EU: for example, phone call information recorded in Finland cannot be inspected by Swedish authorities if the repository is in Finland. If however the recordings are stored to a data center in Sweden, Swedish authorities may, in certain circumstances, legally inspect them. Especially in Telco NFV environments, which handle location or jurisdiction sensitive information on trusted computer hardware, knowing the location (etc.) in a trustworthy manner may become a critical feature affecting run-time management of the data center. For example, having in a high-integrity environment, such as one augmented by trusted components (e.g.: TPM), and need to handle location sensitive information on said trusted hardware, knowing the location in a trustworthy manner may be beneficial for the system. Furthermore, it may be necessary in some cases to provide proof about the location of the data, for example, for officials, such as police or government. Thus, the actual physical location of computing and/or data storing resources may need to be trustfully known.

There are at least two stakeholder groups that are interested in physical location of stored data: 1) the service providers (e.g. cloud service) that need location information for allocating compute and storage resources per the terms in the particular Service Level Agreement (SLA), and 2) service customers (e.g. cloud service customers), who want to get assurance that SLA terms are respected by their service provider. It is possible that instead of a single service provider there is a chain of subcontractors, where the customer contracted Software as a Service (SaaS) provider actually subcontracts a Platform as a Service (PaaS) cloud provider, which is in turn customer of a third Infrastructure as a Service (IaaS) cloud provider. A customer should have visibility through the software stack and be able to inquire geographical location identification or other similar site dependent data for verification purposes with software instance running in a physical server. Consequently, that information may need to be considered when scheduling sensitive software to physical servers at all layers.

Further, in a large data center 200A-D, there can be thousands of server computers (i.e. physical server computers). Verifying their location one by one using manual inspection techniques may be cumbersome and may require a large number of human inspectors or a long period of time and, consequently, accumulating salary costs. To reduce auditing costs there should be at least one partially or fully automated method that supports dependable attestation of the geographical site without adding much if anything to the production costs of the servers or the site. Such a method should be applicable at any unscheduled or unexpected auditing moment.

Figure 2:
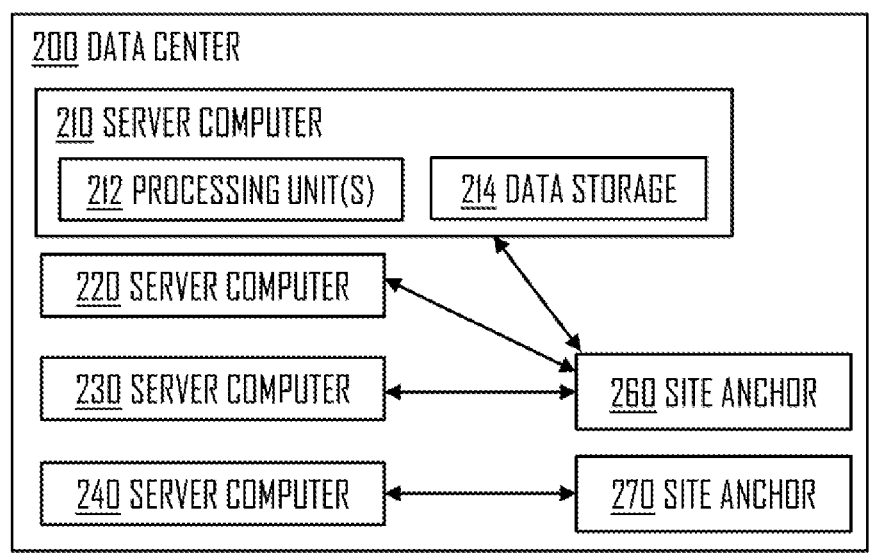
FIG. 2 illustrates a data center according to an embodiment.

Therefore, there is provided a method for obtaining data center specific information concerning stored data. In particular, the method may provide a reliable way to obtain a physical location or related parameter of a server computer that processes and/or stores the data. For example, data center identifier may be indicated. Example of a data center 200 (e.g. 200A, 200B, 200C or 200D) is shown in FIG. 2. Such data center 200 may comprise a plurality of server computers 210, 220, 230, 240 each comprising one or more processing units 212 and one or more data storages 214. Each server computer 210, 220, 230, 240 is further connected to at least one site anchor 260, 270 that is configured to provide the data center specific information. The site anchor(s) 260, 270 may also be comprised in the data center 200. Site anchor(s) 260, 270 may be separate devices of the server computers 210, 220, 230, 240, but communicatively coupled with at least one server computer 210, 220, 230, 240. For example, the site anchor 260 may be configured to provide data center specific information to server computers 210, 220, and 230, whereas the site anchor 270 may be configured to provide data center specific information only to server computer 240. The communication between a site anchor and a server computer may be realized using wired or wireless connection. For example, LAN may be utilized. Thus, data and information may transfer between the site anchor and the server computer(s) to both directions.

Figure 3:
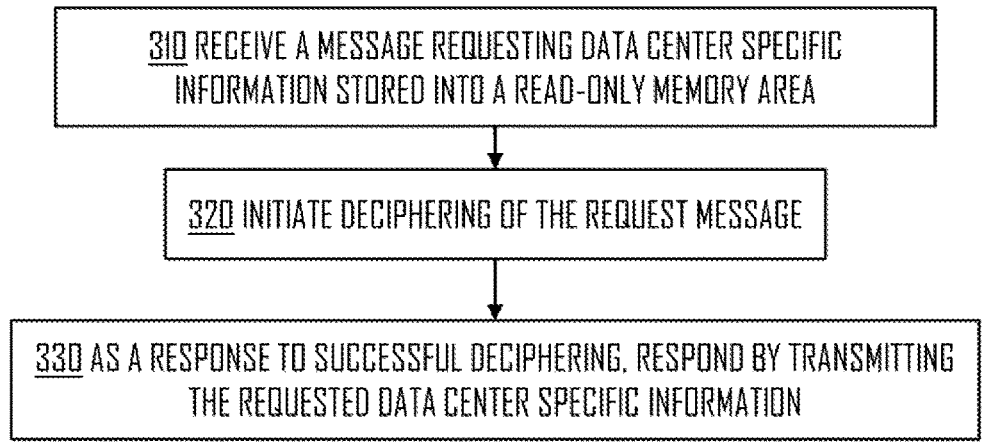
FIG. 3 illustrates a flow diagram according to an embodiment.

FIG. 3 illustrates a flow diagram according to an embodiment. Referring to FIG. 3, an apparatus of a data center may receive a request message from a server computer of said data center, the apparatus and the server computer being physically separate entities communicatively coupled with each other, said message requesting data center specific information stored into a read-only memory area of the apparatus (block 310); initiate deciphering of the request message in response to receiving the request message (block 320); and as a response to successfully deciphering the request message, transmit a response message to the server computer, said message comprising the data center specific information acquired from the read-only memory area of the apparatus (block 330).

The apparatus performing each of the steps 310-330 may be the site anchor 260 or 270 or a similar device of the data center 200 that stores the data center specific information in its read-only memory area. Such method may provide a reliable and cheap way of providing necessary information to the server computer(s) 210, 220, 230, 240 of the data center 200. Thus, the server computers may acquire the data center specific information and utilize it in various ways.

In an embodiment, the data center specific information is specific to said data center, i.e. in which said apparatus is located at.

It may be beneficial to take precautions to prevent servers of a data center site from inquiring site specific data from a site anchor that belongs to another site. These precautions may include round-trip time thresholds and/or usage of limited range communication mechanisms that may not facilitate data transfers between geographically isolated sites, for example, Bluetooth or Wi-Fi.

In an embodiment, the apparatus performing steps 310-330 is comprised in a cellular system, such as described above in more detail with reference to FIG. 1.

It needs to be noted that there may be a plurality of site anchors 260, 270 in the data center 200. Such may be beneficial as the number of request messages (i.e. requesting the data center specific information) may be quite high. Thus, one server computer may also be served by more than one site anchor 260, 270. Further, it may be beneficial to have service provider specific site anchor(s), i.e. specific to a cloud based service provider, who may thus be a customer of cloud computing resources provider. Thus, the site anchors 260, 270 may support load sharing arrangement such that the system may be better protected against possible device failures. I.e. if for example site anchor 260 fails (e.g. breaks), the site anchor 270 may assume its role. Such may be supported by the load sharing arrangement of the data center 200, for example. As both site anchors 260, 270 are situated at the same data center, according to an embodiment, the data center specific information stored in the devices is the same. However, in some embodiments, some of the information may differ. For example, there may be a need to store a different service provider identifier in each of the site anchors 260, 270. Additionally or alternatively, the system may support active stand-by redundancy meaning that if a plurality of site anchors 260, 270 are used, said plurality may support switch over active and stand-by roles of the device pair in case of failure of the active unit, for example. Moreover, the system may, at regular intervals, switch the serving unit so that it may determine status of each unit. Additionally or alternatively, there may be cloud service (e.g. SaaS) provider specific site anchors.

Figure 4A:
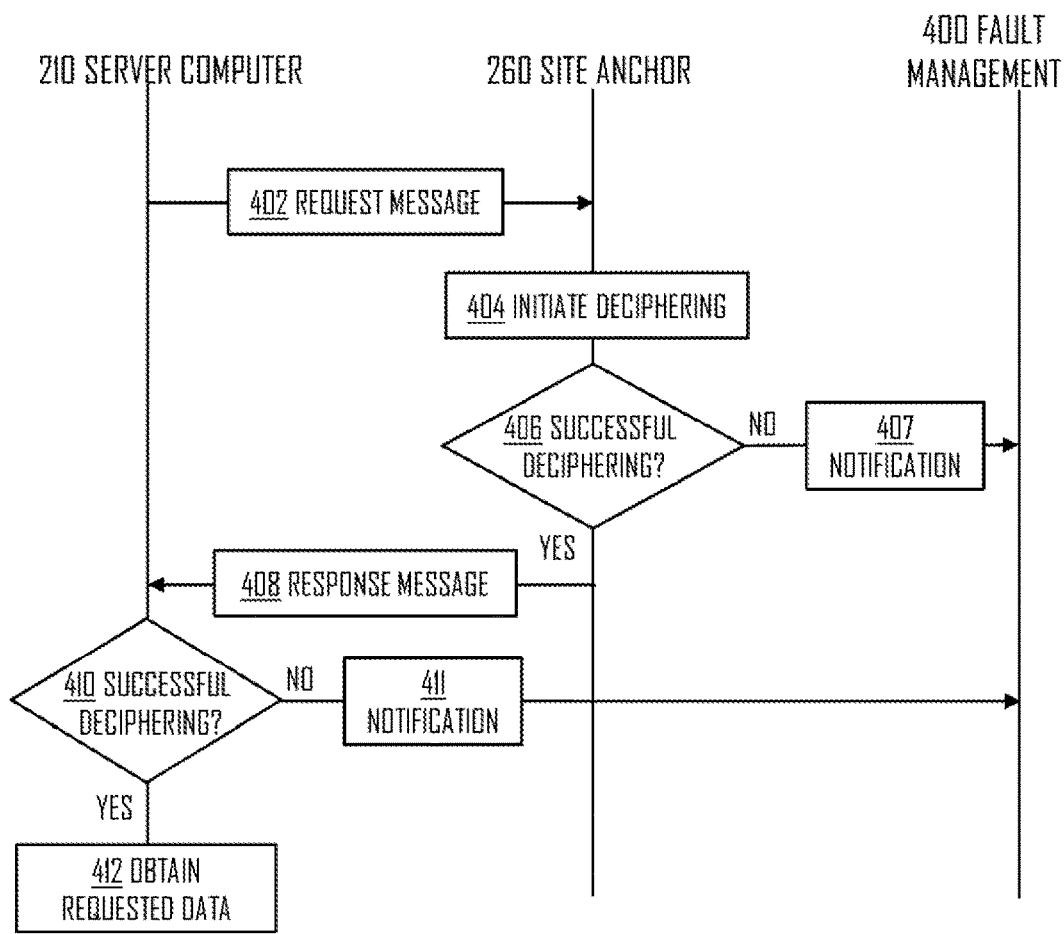
FIGS. 4A to 4B illustrate signal diagrams according to some embodiments.
Figure 4B:
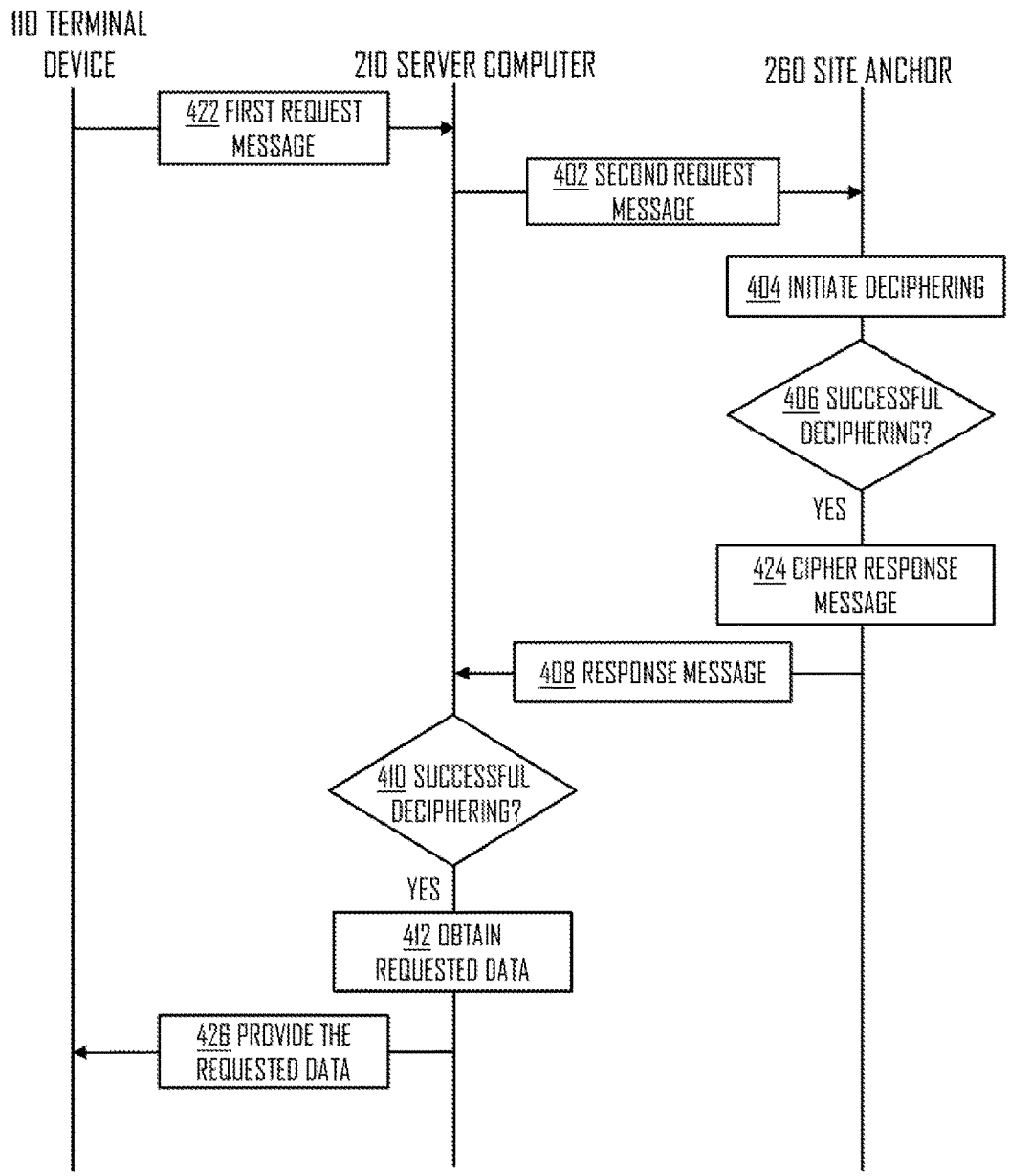

Let us then look a bit closer on some further embodiments. FIGS. 4A to 4B illustrate signal diagrams according to some embodiments. Referring first to FIG. 4A, in block 402, the server computer 210 may transmit the request message to the site anchor 260. This may be similar as in block 310. The transmission may be performed via LAN. E.g. there may be a LAN connection realized by a data cable between the site anchor 260 and the server computer 210.

It needs to be noted all the blocks or steps of FIG. 4A may not necessarily be needed. Hence, as already explained with respect to FIG. 3, the site anchor 260 may receive the request message from the server computer 210. However, the request message is not necessarily ciphered by the server computer 210, and thus the site anchor 260 may not need to decipher said message. Accordingly, the site anchor 260 may respond to the request message by transmitting the response message (block 408). The response message may comprise the requested data center specific information acquired from the read-only memory area of the site anchor 260.

When ciphering is used, in block 404, the site anchor 260 may initiate deciphering the received message. Deciphering may mean that the received message is processed such that it may be read by the site anchor 260. That is, the transmitted message of block 402 may be ciphered or coded, by the server computer 210, using a key. The key may be a ciphering key. Hence, when the site anchor 260 acquires the request message, it may try to open it by utilizing a key (e.g. deciphering key) that is stored in the memory of the site anchor 260. Thus, if the key used to cipher, by the server computer 210, the message and the key used to decipher, by the site anchor 260, the message are associated with each other (i.e. form a key pair), the request message may be successfully opened by the site anchor 260. It may also, in some embodiments, mean that the request message is not corrupted during the transfer or that the requesting server computer knows a public key (i.e. a key of a key pair, wherein a secret key of the key pair is stored at the site anchor 260) to allow requesting the location information, which is proprietary to the service, service provider or application. This may increase tolerance to Denial-of-Service (DoS) attacks against the anchor. If corruption is determined by the site anchor 260, the site anchor 260 may request that the request message is retransmitted by the server computer 210. Alternatively, the site anchor 260 may simply ignore the request, if the deciphering is unsuccessful in order to minimize risk of DoS attack against the anchor 260. Such key pair system or use may be performed according to the Public Key Infrastructure (PKI) practices.

Each site anchor 260, 270 may comprise or store a unique private cryptographic key and/or a primary seed from which the site anchor may compute the keys form. The unique private cryptographic key may only be known by the site anchor. However, in line with PKI practices, a third-party certification authority may assure the public key of the site anchor 260. With help of these keys an individual site anchor can be trustfully identified, for example, by using the PKI keys in encrypting all messages to and from the anchor. Thus, the public key of the site anchor 260 may be used to cipher the request message (e.g. by the server computer 210). The site anchor 260 may then decipher said message using a private key provisioned to the site anchor 260. On the other hand, the site anchor 260 may cipher the response message using the private key that has been provisioned to the site anchor 260, i.e. site anchor 260 private key. The server computer 210 may then decipher said message using the public key of the site anchor 260 provisioned to the server computer 210. Alternatively, the key pair can be used to negotiate symmetric ciphering keys, which may be less compute intensive during normal messaging than asymmetric keys. In block 406, the site anchor 260 may determine whether or not the request message is deciphered successfully. In an embodiment, as a response to unsuccessfully deciphering the request message, the site anchor 260 transmits a report message to a fault management entity 400, the report message indicating that the request message was unsuccessfully deciphered (block 407). Additionally or alternatively, the site anchor 260 may stores a failure log entry to a size limited and wrapping log buffer, from which fault management entity 400 (e.g. fault management service) may check the failures as appropriate, for example, in its regular anchor livelihood check. Livelihood polling may be used to check that an anchor is reachable. Polling frequency could be, for example, once per second to make unauthorized mechanical anchor manipulation practically impossible.

In the case of unsuccessful deciphering, the site anchor 260 may not respond to the server computer 210, and thus the server computer 210 may not acquire the requested information. That is, if the server computer 210 is not entitled for that information, it may not acquire it from the site anchor 260. This is achieved by using the key pair to cipher and decipher the messages between the site anchor 260 and the server computer 210. The public key used with the site anchor 260 may, for example, be indicated only to the server computers that are entitled for the information stored into the site anchor 260. Hence, the risk of information abuse may be decreased. Thus, the use of key pairs known only by the site anchors and the server computers may be beneficial. Even further, the private key of the site anchor 260 may not be known by the server computer 210.

However, as already discussed above, in case of successful deciphering, the process may continue to block 408 in which the response message comprising the data center specific information, requested by the server computer 210, is transmitted to the server computer 210 by the site anchor 260.

In block 410, the server computer 210 may further initiate deciphering of the received response message. If the deciphering is successful, the requested information may be obtained by the server computer 210 (block 412). If the deciphering fails or is unsuccessful, the server computer 210 may indicate this to the fault management entity 400 (block 411). By ciphering also the response message, the security of the system may further be increased as the change of eavesdropping the response message may be decreased.

In an embodiment, the request message comprises a nonce. This may be performed to prevent play-back attack. In some embodiments, to both ways (i.e. the request message and the respond message) may be ciphered and comprise a nonce. So, both the request message transmitted in block 402 and the response message transmitted in block 408 may comprise a nonce. The nonce of the response message may be acquired, by the site anchor 260, from the request message. Hence, both messages may comprise the same nonce. Both messages may additionally be ciphered before transmitting said messages.

In an embodiment, the request message comprises a timestamp from the requesting server (Application Programming Interface (API) library) to prevent routing the requests to an anchor located at a remote site. Nonce and/or timestamp, acquired from the request message, may be copied by the anchor as such to the response message. The site anchor API library, which may be a piece of trusted code, may verify that the nonce value is the same as in the recent request and that the round-trip time computed by subtracting from the time of response reception the time value embedded in the response message is not too large in order to accept only local LAN hops, i.e. prevent information being requested from a remote site anchor.

Other mechanisms that prevent messages from being routed to a site anchor, which is not located in the same data center as the inquiring server, include but not limited to utilizing communication mechanisms that do not work at distances longer than hundred meters or so, like Bluetooth, RFID, infrared link, Wi-Fi, Li-Fi. Distance-bounding protocols can be used to verify the upper limit to the distance. Site specific data from an anchor can be trusted only if there is also trust that the data inquirer is communicating with the site anchor of its own site.

Referring to FIG. 4B, in an embodiment, the request message, requesting the data center specific information, is received, by the site anchor 260, from a terminal device 110 via the server computer 210, wherein the response message is transmitted to the terminal device 110 via the server computer 210. This may require that the ciphering and deciphering operations are successful. For example, the terminal device 110 may request the data center specific information of the server computer 210 to which the terminal device 110 stores or acquires data from (block 422: transmitting the first request message). The server computer 210 may receive such request and as a response transmit a second request to the site anchor 260, which may be located at the same physical site as the server, and storing the data center specific information in its read-only memory area (block 402: same as in FIG. 4A). The process may then continue as in FIG. 4A to block 404 and 406.

If the deciphering is successful, the site anchor 260 may obtain the requested information from its memory. Then the site anchor 260 may generate and cipher the response message (block 424). Same step may also be performed in the process of FIG. 4A between blocks 406 and 408. The response message may be transmitted to the server computer 410. Hence, in an embodiment, the response message is ciphered utilizing a ciphering key before the transmitting the response message (in block 408). The request message (transmitted in block 402) may be deciphered, by the site anchor 260, using the same ciphering key as used in ciphering the response message (transmitted in block 408). Similar logic may apply to the server computer 210 which may use the same ciphering key for ciphering and deciphering messages transmitted between the site anchor 260 and the server computer 210.

In an embodiment, the server computer 210 initiates deciphering of the response message (block 410). If successful, the requested information may be obtained by the server computer 210 (block 412). It may further be transmitted to the terminal device 110 (block 426) that requested the data by transmitting the first request message in block 422. Hence, the terminal device 110 may acquire the data center specific information of the server computer 210. Thus, with trusted software stacks the terminal device 110, or a user of the terminal device 110, may determine, for example, which legislation applies to the stored or acquired user data (e.g. images, videos and the like). As explained above, there may be different use cases for the data center specific information of which the user knowing the applicable legislation may only be one.

The request message transmitted in block 402 may indicate which parameter(s) or value(s) is requested. The site anchor 260 may transmit the requested parameter(s) or value(s) in block 408.

The transmitted message between the site anchor 260 and the server computers may be transmitted via application layer. However, in some cases lower-layer messaging may be alternatively or additionally utilized.

There can be several possibilities for a client to get contact with the certain site anchor. For example, the site anchor can be accessed using address that can be enquired from name service of the network. The name server itself need not be fully trusted because the genuineness of the anchor gets assured during communication with it (e.g. key pair). It is also possible that the client sends a data center site wide broadcast message, to which only a certain site anchor can respond. The site anchor can also be configured to a fixed and well known network address. In the last case, the servers should know these addresses and poll them one by one until it gets a response. One way to force server to talk to corresponding site anchor is to configure site anchor identifier in server's Hardware Security Module (HSM), such as a TPM, so that server knows to which of the site anchors it should talk. Accordingly, the identifier may be name or broadcast message address and port or something else that may be converted at the computing site to an address to access the anchor. It is good practice to configure data center LAN routing and firewalls to allow only local servers to access anchors of the site. LAN configuration and slicing is yet another to facilitate communication between anchors and their clients.

In an embodiment, all involved entities of the system are started up using trusted boot methodology. All entities here may refer at least to the server computer 210 and to the one or more site anchors 260, 270. So, basically the site anchor 260 may be started up using trusted boot. Similarly, the server computer 210 may started up using trusted boot. If running software stack cannot be trusted, the location information passing through them may become untrustworthy, regardless of how trustable it was in the first place. It might be possible that transmitting location data in ciphered mode could maintain trustworthiness even when passed through untrusted middlemen. However, using the trusted boot at both the server computer(s) and the site anchor(s) may increase the trustworthiness of the data center specific information transfer. Additionally or alternatively, the software running in the site anchor 260 and/or software running on the server computer 210 may run in read-only memory (ROM) of the respective device. The software code may be certified and procedure to put it into ROM trusted. Software in ROM may become the hardware root of trust. Once programmable PROM should qualify, because it is write once memory. In an embodiment, EPROM is not used.

To enforce the authorization of trust anchor, the provision of trusted computing technologies such as TPM, PTT, and/or TrustZone may be required to ensure that each site anchor is trusted. It is also possible that software in the site anchor is stored to read-only memory which cannot be modified after leaving the manufacturing plant. Further integrity checks on the site anchor may be provided using remote attestation or similar.

Figure 5A:
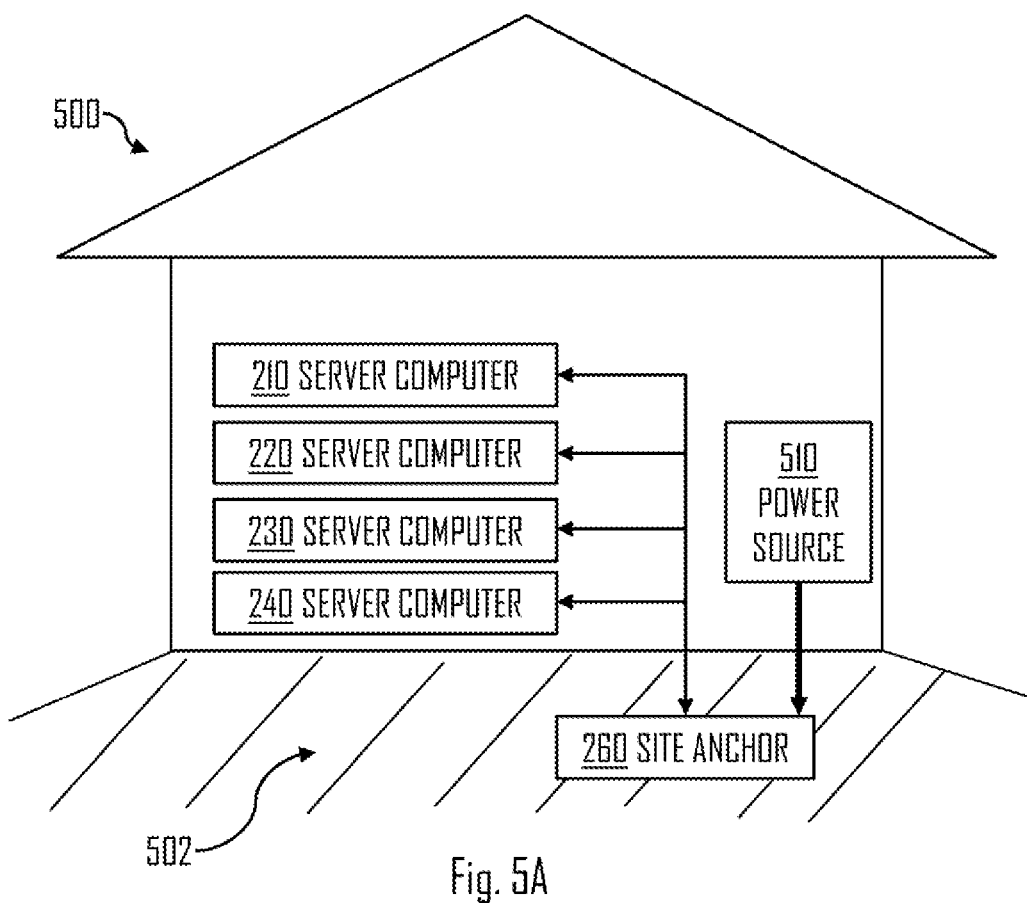
FIGS. 5A to 5D illustrate some embodiments.

FIG. 5A illustrates an embodiment. Referring to FIG. 5A, the site anchor 260 (or similar apparatus/device performing the functionalities described) may be enclosed within a structure 502 of a building 500. In the example of FIG. 5A, the structure 502 may be the base 502 of the building 500, but could be some other structure of the building, such as wall, floor or ceiling. In an embodiment, the site anchor 260 is situated in a basement of the building 500. The enclosing may be performed such that the site anchor 260 is still communicatively connected with the server computer(s) 210, 220, 230, 240. Thus, the site anchor 260 or site anchors may be provisioned and sealed to the site, for example, under supervision of a third party independent human auditor and permanently attached to the ground or to the building structures. The data center 200 may be situated in the building 500. The sealing or enclosing of the site anchor at the site (i.e. within the structure or in the ground) may be performed in such a manner that the site anchor cannot be relocated without this act being detected, causing total loss of trusted information or fatal physical damage to the site anchor 260 or unreasonable costs. The site anchor 260 may comprise a packaging that prevents tampering and that contains attachment mechanism to lock the site anchor 260 permanently to a counterpart structure of the building 500. For example, in FIG. 5A, the site anchor 260 may be installed under the building 500 (e.g. within the base 502) during build time or in a later drilled hole filled with concrete. In cases where the site anchor 260 is physically "anchored" to a place, e.g.: through embedding in building materials, then some form of physical integrity might be combined into the hardware of the unit such that any attempt to remove or reconfigure the system would result in the destruction of the site anchor 260 either completely or partially.

According to an embodiment, the site anchor 260 is further connected to a power feed cable providing operational power to the site anchor 260 form a power source 510. In some embodiment, the site anchor 260 itself comprises the power source. However, the power source 510 may be beneficial to be situated in the data center 200 or in the building 500 (or in general) such that it may be serviced without a need to remove the site anchor 260 from the structures 502. Hence, a simple power cable may suffice that is connected to power output (e.g. electrical power network).

According to an embodiment, the site anchor 260 comprises a power over Ethernet interface (i.e. IEEE 802.3 standards). Thus, the site anchor 260 may be connected to the server computer 210 and/or server computers using the power over Ethernet interface which may enable both power input and data transfer at the same time. There may be a mediating device used between a plurality of server computers and the site anchor(s).

Figure 7:
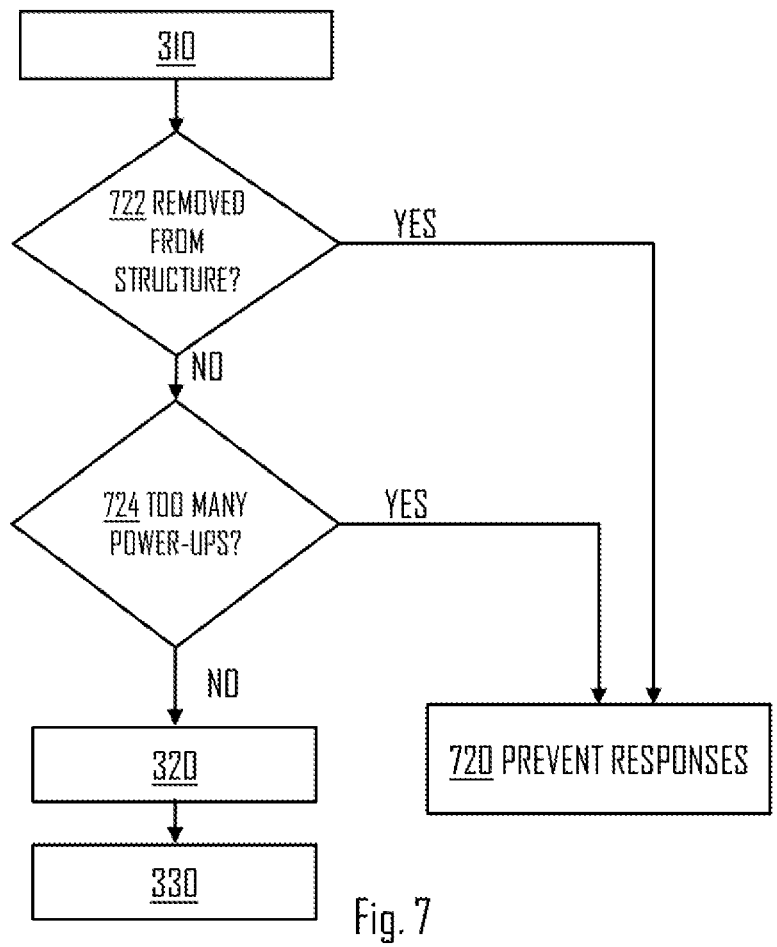
FIG. 7 illustrates an embodiment.

There are some cases in which it may be beneficial to configure the site anchor 260 not to transmit response message(s) in response to the request message requesting the physical location specific information. FIG. 7 illustrates an embodiment in which the transmission of the response message(s) may be prevented. That is, the site anchor 260 may receive the request message in block 310 (i.e. block 310 of FIG. 3). Before or after deciphering the message in block 320, the site anchor 260 may determine to prevent transmitting the response message if at least one predetermined condition is fulfilled. Such determination may also be performed without receiving any request messages from the server computer(s).

However, in an embodiment, the site anchor 260 prevents transmitting response messages in response to request messages (block 720) if the site anchor 260 is removed from the structure 502 of the building 500 (block 722). The components of the site anchor 260 may be, for example, casted into some material that prevents mechanical manipulation of the site anchor 260 without destroying it beyond repair. If the anchor becomes broken, a new anchor device may need to be deployed and commissioned. Thus, if the site anchor 260 is removed from its installation, it may be configured not to provide the data center specific information. This may happen automatically. That is, if the site anchor 260 is removed from its installation, it may automatically configured itself not to respond to request messages in the way that is was described above. This may mean that the site anchor 260 does not respond at all or that the site anchor 260 responds with some other message (e.g. indicating that location information cannot be provided), and/or indicate some other entity (e.g. fault management 400) that a request was received, but it cannot be answered. This may prevent, for example, the site anchor 260 to be installed to a different location and thus providing false location information. The site anchor 260 may detect the removal by various different ways. One may be the use of a sensor that detects acceleration of the site anchor 260. As the installed site anchor 260 should be relatively still, measurement results from one or more acceleration sensors of the site anchor 260 may reveal the removal which may in turn trigger, for example, a kill switch (e.g. destruction of memory or some other vital part of the site anchor 260). However, there are multiple different options that can be used to detect the removal of which the use of one or more motions sensor(s) (e.g. gyroscope(s) and/or acceleration sensor(s)) may be just one.

In an embodiment, the site anchor 260 prevents transmitting response messages in response to request messages (block 720) if the site anchor 260 is powered-up at least a predetermined number of times, wherein the predetermined number is at least two (block 724). For example, the site anchor 260 may be configured to increment a counter every time it is powered up. If the counter value exceeds a certain value, the transmission of responses may be prevented. For example, if the threshold value is set to one, the site anchor 260 may be powered on only once. Typically, the threshold value may be set to a higher value, and the actual power-up count can be requested and provided among the response message (block 408). Additionally or alternatively, the power-up count may be provided in each response message, even without a specific request. That is, the response message may comprise a data field for indicating the actual power-up count. This enables the application to relay the restart count to the administration of the customer for further processing. For example, if the reset or power-up count is high, it may raise suspicions about the reliability of the data center specific information. Hence, in an embodiment, the response message comprising the data center specific information further comprises the power-up count indicating how many times the site anchor 260 has been switched on and/or off.

Figure 5B:
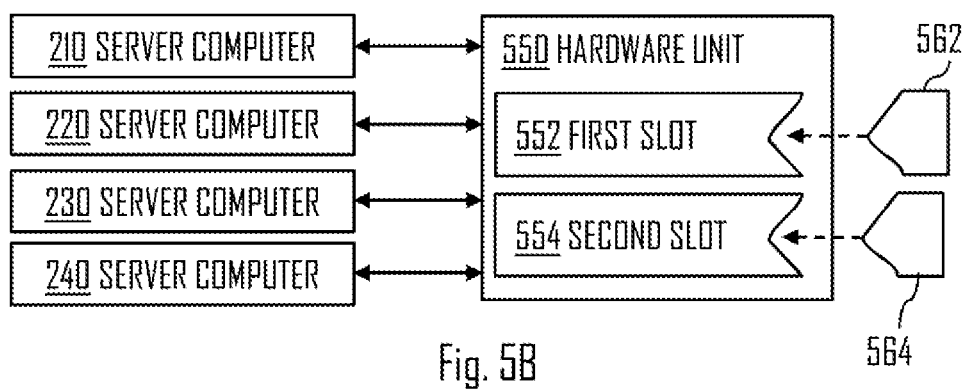
Figure 5C:
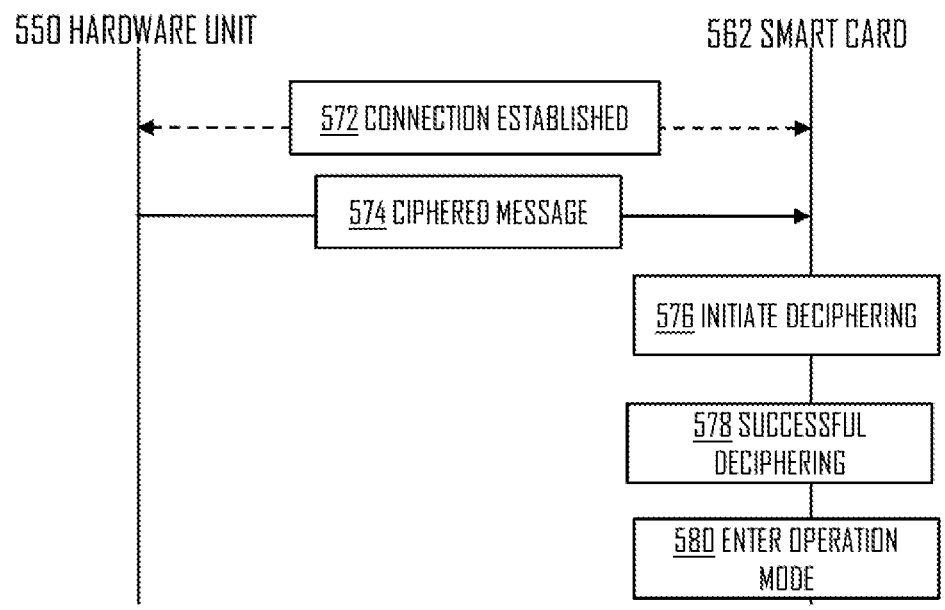
Figure 5D:
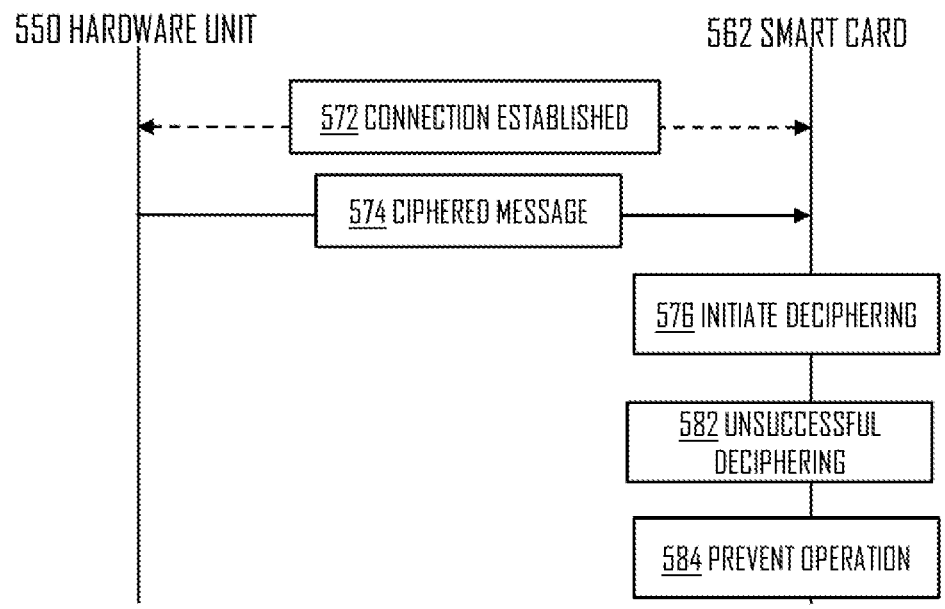

FIGS. 5B to 5D illustrate some embodiments. FIG. 5B illustrates a system comprising a hardware unit 550 that is situated at and/or comprised in the data center 200. FIGS. 5C to 5D illustrate some embodiments, wherein the site anchor (e.g. site anchor 260) is realized with the use of smart card 562, 564 that is connected to the hardware unit 550. It needs to be noted that although some examples and embodiments are described performed by the site anchor, this should be understood broadly in the sense that the site anchor comprises the smart card (i.e. the smart card realizes the functionality of the site anchor). The difference may be that the smart card may require the hardware unit 550 to function correctly.

Referring to FIG. 5B, the data center 200 may further comprise the hardware unit 550 comprising one or more receptacles 552, 554. Said receptacles may be understood as slots or smart card slots which may comprise physical element that is configured to receive a smart card or similar device. The hardware unit 550 may also be referred to as a hardware slot array, for example.

The hardware unit 550 may further be communicatively connected (e.g. wired connection, such as LAN, but wireless connection may also be utilized in some cases) to the server computers 210, 220, 230, 240 of the data center 200. The apparatus performing the steps of FIG. 3 (e.g. the site anchor 260) may thus comprise a smart card 562, 564 configured to be inserted into a corresponding receptacle 552, 554 of a hardware unit 550 of the data center 200. The hardware unit 550 may comprise a plurality of receptacles 552, 554 for receiving smart cards 562, 564. Thus, there may be a plurality of smart cards 562, 564 each realizing the functionality of a site anchor (e.g. site anchor 260).

The proposed smart card system may be configured such that some functionalities of the site anchor 260 are shared between the smart card 562 and the hardware unit 550. For example, LAN interface may be comprised in the hardware unit 550. Thus, there may be no need to have each of the smart cards 562, 564 to have certain functionality that is already present at the hardware unit 550. Thus, complexity and cost of the system may be reduced. However, it may be that the smart card 562 comprises all features of the site anchor 260 and/or is configured to perform all the functions of the site anchor 260. The difference in such case may be that the smart card 562 may be changed, whereas the site anchor 260 may be permanently fixed to the building such that it cannot be removed without breaking the site anchor 260.

When the smart card 562, 564 is inserted to the corresponding receptacle 552, 554, an electrical connection between the smart card 562, 564 and the hardware unit 550 may be realized. The electrical connection maybe realized via an interface that is realized with a first interface element at the hardware unit 550 and a second interface element at each smart card 562, 564. The interface may enable data/information transfer between the hardware unit 550 and the smart cards 562, 564.

To enable the smart card system to function with more security, the hardware unit 550 may comprise its own key(s) (e.g. cryptographic keys). For example, the keys may be asymmetric PKI keys. When the smart card 562, 564 is inserted into the corresponding slot 552, 554, the smart card 562, 564 may receive the key(s) from the hardware unit 550 and validate the key(s) to prevent it from being inserted to a wrong slot or wrong hardware unit 550. If the smart card 562, 564 is inserted into a right slot, the smart card 562, 564 may enter operational mode (i.e. respond with data center specific information). If the smart card 562, 564 is inserted into a wrong slot, the smart card 562, 564 may prevent responses. Thus, wrong location information may not be received by the server computers 210, 220, 230, 240.

To enhance security of the system, the hardware unit 550 may be deployed and mechanically fixed to the physical site, so that it cannot be moved elsewhere without causing permanent disablement of the unit, under surveillance of a trusted auditor. However, the smart card 562, 564 may be inserted by anybody as the validation between the smart cards 562, 564 and the hardware unit 550 is utilized. The hardware unit 550 may embed a Software-defined networking (SDN) switch to make cabling easier. However, any LAN router or switch may be used. Each slot 552, 554 may be connected to its own data port in the switch. In some embodiments, the hardware unit 550 may also offer some additional functionality, like accelerometer and backup power source that are comprised in the hardware unit.

In an embodiment with reference to FIG. 5C, after the smart card 562 is inserted into the corresponding slot 552 and/or in response to said inserting, the smart card 562 receives a message from said hardware unit 550 (e.g. the hardware unit 550 detects the insertion and transmits a message via the interface to the correct slot and/or correct smart card) (block 574). Before that a connection may be established between the two (block 572). It further needs to be noted that the smart card may be inserted into any free slot of the hardware unit 550.

The message transmitted and received in block 574 may be ciphered by the hardware unit 550 using the key (e.g. asymmetric key). In block 576, the smart card 562 may initiate deciphering of said message. At least one key may be used to try to decipher the message. For example, the smart card 562 may comprise or store a key that forms a pair with the key of the hardware unit 550 that was used to cipher the message. In such case, the deciphering should be successful.

As a response to successfully deciphering said message (block 578), the smart card 562 may enter operation mode in which the smart card 562 is configured to receive request messages from server computers and respond by transmitting the data center specific information stored in its read-only memory area (block 580).

FIG. 5D illustrates the case in which the message is not deciphered successfully. Thus, the smart card 562 may prevent transmitting response messages to request messages (block 584). This may happen if the message is unsuccessfully deciphered (block 582).

Figure 6:
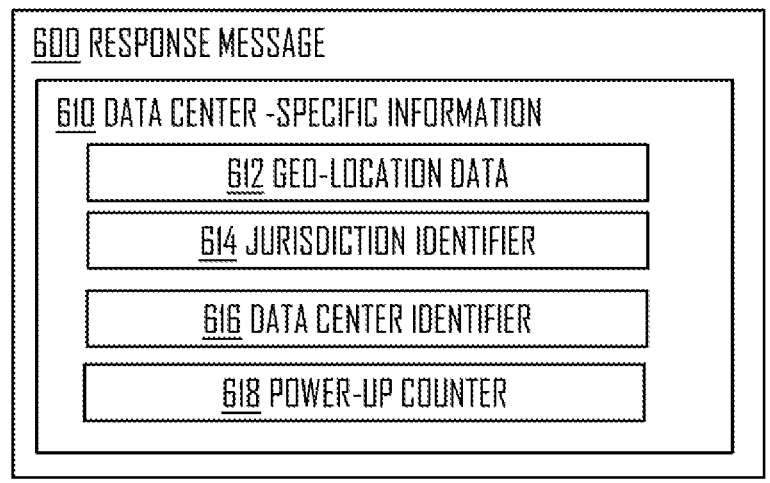
FIG. 6 illustrates a response message according to an embodiment.

FIG. 6 illustrates the response message (e.g. transmitted by the site anchor 260 in block 330 or block 408) according to an embodiment. Referring to FIG. 6, response message 600 comprises the data center specific information 610. In an embodiment, data center specific information 610 comprises physical location associated information.

According to an embodiment, the data center specific information 610 comprises geolocation data 612. In an embodiment, the geolocation data is pre-stored to the read-only memory area of the site anchor 260. For example, the geolocation data may comprise coordinates of the data center 200. In some embodiments, the geolocation data may be updated (e.g. by the site anchor using satellite positioning circuitry). The geolocation data 612 may be understood as part of the physical location associated information, for example.

According to an embodiment, the data center specific information 610 comprises a jurisdiction identifier 614. The jurisdiction identifier may indicate the country in which the data center 200 is located at, for example. For example, the jurisdiction identifier may indicate the applicable law at the location of the data center 200. I.e. what law or which law is applicable to the data stored or processed in the data center 200. It needs to be noted that processing data may also mean that the data is temporarily stored (e.g. in working memory of a processor). Using the jurisdiction identifier may directly indicate to the location information requestor (e.g. server computer or terminal device) the applicable law. Thus, there may be no need to use coordinates or similar identifiers to determine the applicable law. This may make the system simpler. For example, the site anchor 260 could only store location information indicating a country, such as 'Finland' or 'United States of America' or an area that utilizes similar or partly same legislation, such as 'European Union'.

According to an embodiment, the data center specific information 610 comprises a data center identifier 616 uniquely identifying the data center the site anchor is associated with (e.g. the site anchor 260 may indicate identifier of the data center 200). For example, the server computer 210 or the terminal device may then use this identifier to determine which legislation is applicable to the stored data by comparing the identifier to one or more data arrays compromising legislation information associated with data center identifiers. The data center identifier 616 may, for example, comprise a symbolic name of the data center 200 site in which the site anchor 260 is located at or in. The associated data center may mean the data center where the site anchor is located at.

According to an embodiment, the data center specific information 610 comprises a power-up counter 618 indicating number of times the site anchor 260 has been powered up. As described above, this number may be a further indication about integrity of the location associated information.

According to an embodiment, the data center specific information 610 comprises the geolocation data 612, the jurisdiction identifier 614, the data center identifier 616, and/or the power-up counter 618.

Figure 8A:
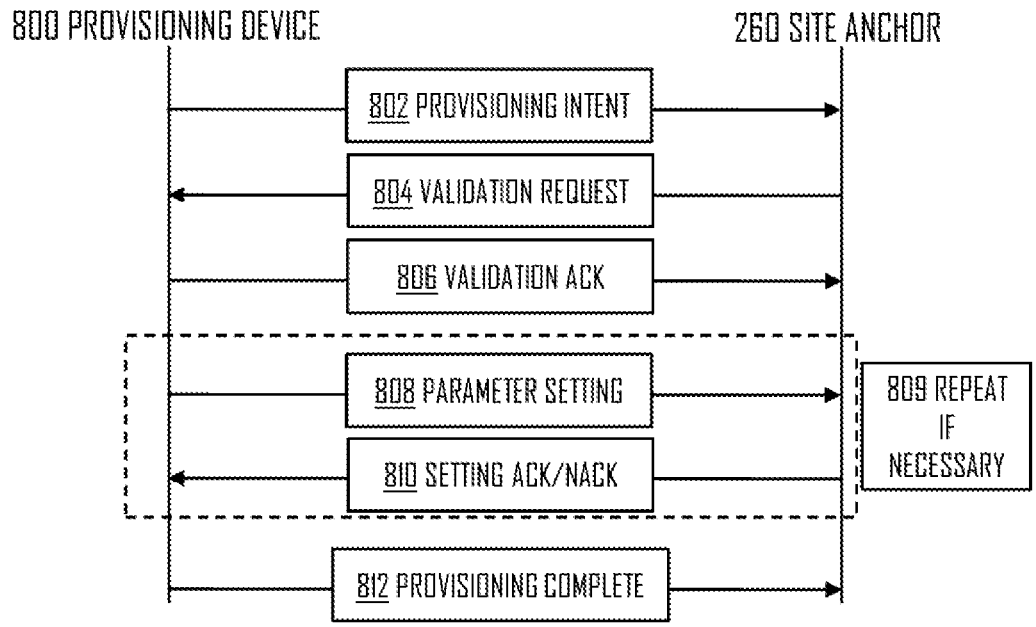
FIGS. 8A to 8B illustrate signal diagrams according to some embodiments.
Figure 8B:
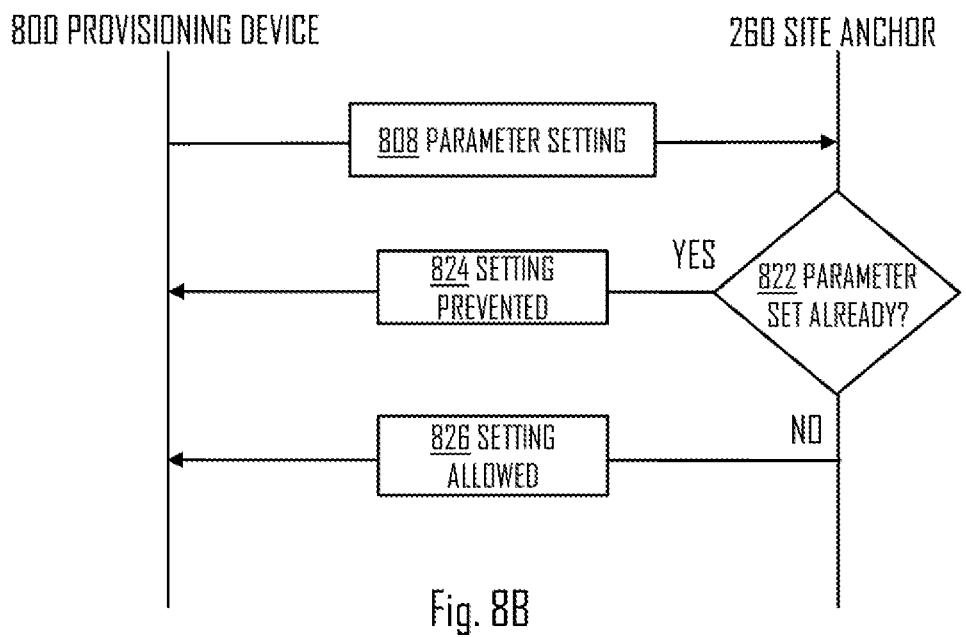

Let us then look at FIGS. 8A to 8B illustrating some embodiments. Referring to FIG. 8A, provisioning of different parameters to the site anchor 260 may be shown. According to an embodiment, the site anchor 260 receives at least one configuration message from an external device, wherein the data center specific information is preset or set into the read-only memory according to the received at least one configuration message (block 808). The external device may be the provisioning device 800, for example. The provisioning device 800 and the site anchor 260 may be connected with each other via wired or wireless communication, such as LAN, Universal Serial Bus (USB), Bluetooth, WLAN and/or WiFi. The site anchor 260 may support one or more wired and/or wireless technologies of which the described technologies are just examples.

According to an embodiment, the provisioning device 800 transmits a configuration message per parameter (block 808). Thus, more than one configuration message may be transmitted. The parameter(s) may comprise the geolocation data 612, the jurisdiction identifier 614, the data center identifier 616, and/or keys (e.g. ciphering keys) related to the insertion to a particular hardware unit 550. In an embodiment, the site anchor 260 replies to the configuration message (i.e. parameter setting message) by transmitting an acknowledgement (ACK) or non-acknowledgement (NACK) message to the provisioning device 800 (block 810). That is, ACK may be transmitted if the parameter is set successfully and NACK may be transmitted if the parameter is set unsuccessfully. Blocks 808 and 810 may be repeated to set all necessary parameters (block 809). Additionally or alternatively, the blocks 808, 810 may be repeated if a parameter is unsuccessfully set. Resetting may be tried, for example, two or three times.

Figure 9:
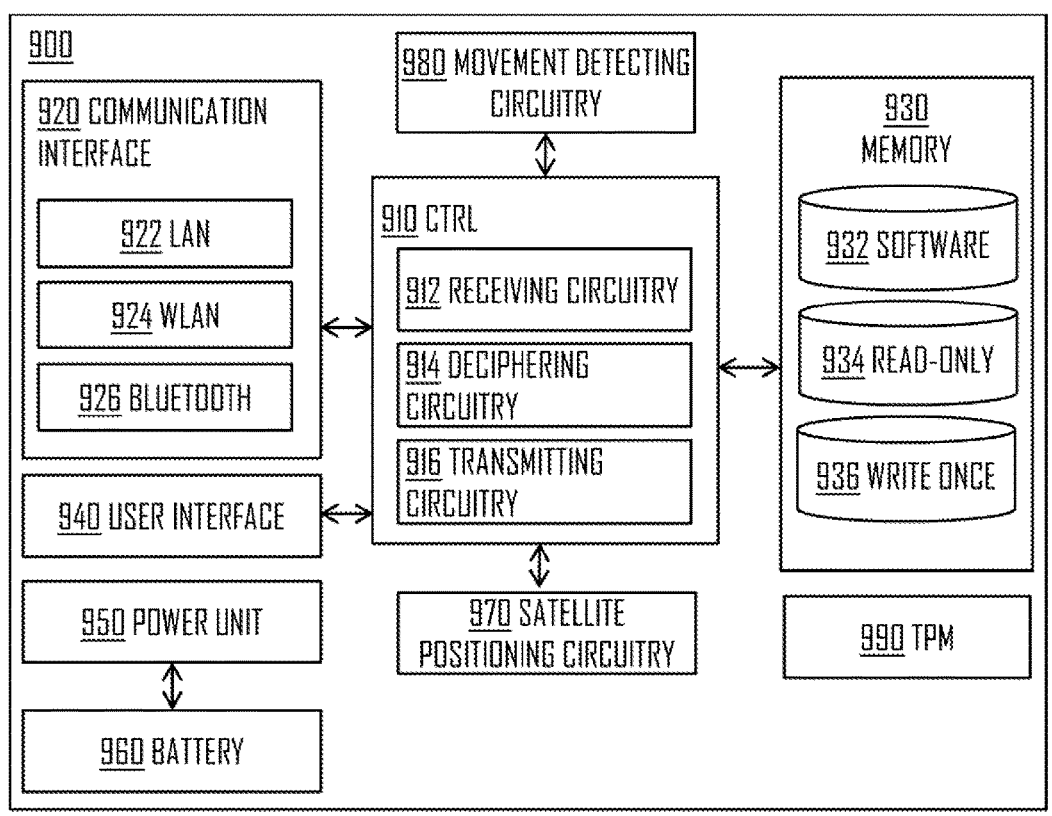
FIG. 9 illustrates a block diagram of an apparatus according to an embodiment.

At this point it may be beneficial to describe in a bit more detail what is meant by the read-only memory area of the site anchor 260. FIG. 9 illustrates an embodiment of an apparatus 900 which may comprise the site anchor 260. The apparatus 900 may comprise a memory 930 that has the read-only memory 934. The read-only memory 934 may only be read by the apparatus 900 (e.g. the site anchor 260). Hence, the site anchor 260 may not rewrite any data to the read-only memory 934. The read-only memory 934 may be understood as write once memory 936 to which data is written or stored once. When data is stored to the write once memory 936, it may become read-only memory 934.

For example, parameter setting (block 808) may only be successful if that parameter has not yet been set into the read-only memory area of the site anchor 260. For example, the provisioning of the parameter (e.g. the location associated information) may be performed at least partially at a factory. Some parameters may be set at the site. Alternatively, all parameters used may be set at the site. For example, additional parameters (i.e. not yet set) may be added at the site.

Referring to FIG. 8A, when the provisioning device 800 is used to provision at least one parameter to the site anchor 260, the provisioning device 800 may transmit a provisioning intent message to the site anchor 260 (block 802). The site anchor 260 may reply with a validation request (block 804) to which a validation ACK/NACK may be transmitted by the provisioning device (block 806). The validation may be performed using key(s) or a key pair to determine that the provisioning device 800 has right to set the parameter(s) in block 808. Basically, the provisioning device 800 may perform the parameter setting if it has public key of the site anchor 260 and the parameter has not yet been set to the site anchor 260. So basically, only new parameters may be added.

The provisioning device 800 may be special equipment or a software application running, for example, in a user device, such as a laptop computer or mobile device. Parameter values may be stored to the site anchor one by one (block 808). Once all intended values are set, the site anchor 260 may be set to state where it waits for being deployed to use (e.g. by transmitting the provisioning complete message of block 812). A provisioning device 800 identifier and identity of the auditor using it may be stored into memory of the site anchor 260 for later reference. As described, the provisioning device 800 may be used at the site of the data center 200 or at a factory, for example.

Basically, when the site anchor 260 is manufactured, the site anchor 260 may be reset to Uninitialized state, in which all information is cleared except a primary seed is set to give the site anchor 260 its unique identity. This may be as described in Trusted Platform Module (TPM) 2.0 specifications. Similarly to TPM 2.0 practices, also primary storage key certificate can be readily stored to the persistent storage of the site anchor 260, but the keys can also be computed from the primary seed by the site anchor 260. Thus, at least either the actual key(s) or the primary seed is stored to the memory of the site anchor 260. Persistent storage may mean a memory area which cannot be rewritten (i.e. read-only memory). Thus, the primary seed or key(s) (e.g. public and private keys) may be provisioned once to the site anchor 260.

In an embodiment, the site anchor 260 is resettable or unresettable. This may depend upon local requirements. If a site anchor is reset its root key or seed may get a new value, which may invalidate all earlier keys (including deciphering keys. The reset may force a history of previous settings to be known to any user such that its reset history is always obvious.

In an unchangeable system, one embodiment is that a technology such as write-once memory is used such that a reset would require physical access and active removal of components which may be cryptographically signed, (c.f.: TPM) required.

In an embodiment, the at least one configuration message is received utilizing wireless radio communication (e.g. Bluetooth, WLAN). All communication between the devices in FIGS. 8A and 8B may happen wirelessly. However, the provisioner must take care that communication is done with the correct anchor device if several are within range. This may be based on, for example, sharing identifiers or similar data elements between the provisioning device and the site anchor 260.

In an embodiment, the data center specific information comprises at least one parameter, wherein each parameter is settable only once. E.g. parameters 612, 614, 616 may only be set once to the site anchor 260. The parameters may thus comprise at least one of the geo-location data 612, jurisdiction identifier 614, the data center identifier 616, threshold for the power-up counter 618, and the physical location associated information. The power-up counter 618 itself should rewritable as the value may change each time the site anchor 260 is powered-up.

Referring to an embodiment of FIG. 8B, the site anchor 260 may receive a configuration message from the external device (e.g. the provisioning device 800) associated with a certain parameter of the data center specific information (block 808); determine whether or not said certain parameter has already been set (block 822); and if said certain parameter has not yet been set, allowing setting said certain parameter according to the configuration message (block 826), or if said certain parameter has already been set, preventing resetting said certain parameter (block 824). The blocks 824, 826 may comprise transmitting ACK/NACK message to the provisioning device 800 accordingly.

Simple site anchor embodiments may rely on human auditor to start the provisioning phase, when sufficient, customer specific security conditions are fulfilled. More advanced embodiments may require a special provisioning device being employed. In this case the site anchor is connected with the provisioning device. These two may validate each other by using PKI. The public key of the other party may be preconfigured to the devices. In an embodiment, the site anchor 260 comprises the public key of the provisioning device. However, in an embodiment, the site anchor 260 comprises a public key of a provisioning device category. This may mean that said public key is used by a plurality of provisioning devices. This may enable a plurality of provisioning devices to be used with the same site anchor 260, thus making the system even more advanced.

Furthermore, each provisioning device may store a list of public keys of site anchors. When responding to ciphered validating request from the site anchor 260 (block 804), the provisioning device 800 may try public keys known to it (i.e. from the list) until it finds a matching one, if any. If correct key is found, the provisioning device may transmit the validation ACK, and the provisioning may commence as described. When the key(s) are found, the provisioning device 800 may also determine which provisioning functionality the site anchor 260 can support. This may enable newest provisioning device models to work with old anchor devices.

During the provisioning the customer specific location, jurisdiction, additional PKI keys, software licenses and other trusted data may be stored to the site anchor. Thus, other parameters than only those described with reference to FIG. 6 may be set.

In a rather simple scenario, a site anchor may be deployed to use by connecting it to its final power source and to the communication network, like data center LAN. The site anchor may be deployed to its final location and secured under surveillance of a trusted auditor or inserted to a slot in case of a smart card form site anchor.

FIG. 9 illustrates a block diagram of an apparatus 900 according to an embodiment. In an embodiment, the apparatus 900 is or comprises the site anchor 260. In an embodiment, the apparatus 900 is or comprises the smart card 562. At least some of the functionalities of the apparatus 900 may be shared between the smart card 562 and the hardware unit 550, for example. In an embodiment, the apparatus 900 is the apparatus performing the steps of FIG. 3. Referring to FIG. 9, the apparatus 900 may comprise a control circuitry (CTRL) 910, such as at least one processor, and at least one memory 930 including a computer program code (software) 932, wherein the at least one memory and the computer program code (software) 932 are configured, with the at least one processor, to cause the respective apparatus 900 to carry out any one of the embodiments of FIGS. 1 to 8B, or operations thereof.

Referring to FIG. 9, the memory 930, may be implemented using any suitable data storage technology, such as semiconductor based memory devices, flash memory, magnetic memory devices and systems, optical memory devices and systems and fixed memory. The memory 930 may comprise the software 932. The memory 930 may comprise the read-only memory area 934 for storing at least the data center specific information. The memory 930 may further comprise the write once memory area 936 for setting the parameter(s) for the first time, as described above in more detail.

In an embodiment, the apparatus 900 comprises TPM or similar HSM functionality providing component. The TPM may provide, for example, a secure storage for cryptographic keys. Also the non-volatile, write once memory could be provided on TPM 990. Hence, for example, the memories 934, 936 may be provided on the TPM 990.

The apparatus 900 may further comprise communication interface 920 (also referred to as communication circuitry) comprising hardware and/or software for realizing communication connectivity according to one or more communication protocols. The communication circuitry 920 may provide the apparatus with communication capabilities to communicate with the server computers 210, 220, 230, 240, for example. The communication circuitry 920 may comprise standard well-known components such as an amplifier, filter, frequency-converter, (de)modulator, and encoder/decoder circuitries and one or more antennas. For example, the communication circuitry 920 comprises LAN circuitry 922, WLAN circuitry 924, and/or Bluetooth circuitry 926.

The apparatus 900 may comprise a user interface 940 comprising, for example, at least one keypad, a microphone, a touch display, a display, a speaker, etc. The user interface 940 may be used to control the respective apparatus by a user of the apparatus 900. However, in some cases, the user interface is realized only via the communication circuitry 920. I.e. only an external device may be used to control the apparatus 900. In some cases, the apparatus 900 does not have any kind of user interface. This may further enhance security of the apparatus 900.

In an embodiment, the apparatus 900 comprises a central processing unit connected with different kinds of memory and I/O devices. The non-volatile memory 934 (i.e. read-only memory) and private key storage may be implemented, for example, using the TPM component 990, which can be also useful in attesting that intended software is running in the anchor. Instead of a specific TPM component 990 (e.g. a physical TPM component), similar functionality may be achieved using trusted software running only in the secure mode of the CTRL 910 (i.e. processor or processors).

According to an embodiment, the apparatus 900 comprises a power unit 950. The power unit 950 may be configured to receive electricity from an external power source and provide operational power to the apparatus 900. The apparatus 900 may further comprise a back-up battery 960 for providing back-up for the external power source. Additionally or alternatively, the memory 930 may be configured to save the state of the apparatus 900 in case of external power break.

Referring to FIG. 9, in an embodiment, the control circuitry 910 comprises a receiving circuitry 912 configured to cause the apparatus 900 to receive a request message from a server computer 210 of a data center 200, the apparatus 900 and the server computer 210 being physically separate entities communicatively coupled with each other, said message requesting data center specific information stored into a read-only memory area 934 of the apparatus 900; a deciphering circuitry 914 configured to cause the apparatus 900 to initiate deciphering of the request message in response to receiving the request message; and a transmitting circuitry 916 configured to cause, as a response to successfully deciphering the request message, transmitting a response message to the server computer, said message comprising the data center specific information acquired from the read-only memory area 934 of the apparatus 900.

According to an embodiment, the apparatus 900 comprises a movement detecting circuitry 980. The movement detecting circuitry 980 may comprise accelerometer(s), gyroscope(s) and/or magnetometer(s). As described above, such sensor(s) may be used to detect if the apparatus 900 is moved. If movement is detected, for example, the apparatus 900 may stop or prevent sending messages comprising the data center specific information in order to prevent abuse.

According to an embodiment, the apparatus 900 comprises a satellite positioning circuitry 970. Such circuitry may comprise, for example, a Galileo positioning system, a Global Positioning System (GPS) and/or Global Navigation Satellite System (GLONASS) circuitry. Thus, in some embodiment, the location of the apparatus 900 may be updated. In such case, the apparatus 900 may need to utilize memory area that allows rewriting of data/information.

According to an embodiment, there is provided a data center system comprising: at least one server computer 210, 220, 230, 240 and at least one apparatus 900.

In an embodiment, the at least one server computer 210, 220, 230, 240 is configured to perform operations comprising: transmit a request message to the at least one apparatus 900, said message requesting data center specific information from a read-only memory area of the at least one apparatus; as a response to the transmitting, receive a response message from the at least one apparatus 900, said message comprising the data center specific information acquired from the read-only memory area of the apparatus; determine a time between transmitting the request message and receiving the response message; and if said time exceeds a threshold, discard the received data center specific information. Such functionality may further enhance reducing abuse of the system. That is, a server computer located at some other location may not use the location information of some other data center if the time limit is used. For example, appropriate maximum limitations to Round Trip Time (RTT), network route hop count and network topology may be applied to prevent servers from communicating with a site anchor at another, geographically separate site. The threshold settings may be configured under supervision of the auditor. This parameter may be included into trusted boot data hash measurement at the servers.

Further considering different use cases and examples, one possible scenario with data center specific information may be that whenever a physical server computer 210, 220, 230, 240 restarts, a trusted software component in it may in response enquire from the site anchor 260, using address known by the name service of the cloud system, for example, the data center specific information and store it into its memory. Thus, when a user device requests the said information, the server computer may answer using the local copy of the data center specific information. As an extra precaution the information may also be verified with the site anchor at regular intervals. It may be possible for an application to retrieve the information directly from the site anchor device by invoking a special API function. In such case, the server computer may not respond with the information from its own memory.

Another scenario is that the site or data center has many customer specific site anchors, which may have different proprietary identifiers and other information for the site. In this case the information can be copied to a location specific register and non-volatile random-access memory (NVRAM) of virtual TPM (vTPM) because virtual machine (VM) images can be application specific. It can be trusted if the run-time VM images are integrity checked with cryptographic signatures or alike.

If the volume of inquiries exceed amount which can be handled by a single site anchor it is possible to use load sharing scheme by using normal network management means. It is also possible to utilize the LAN routing mechanisms to support duplicated site anchors for certain application or customer for increased reliability.

In above explained cases it is possible to install new servers to the data center site and make automatically available, for example, trustable geographical location information for the applications running in them. There may be no need for another site visit by an auditor after the first one, as long as there are functioning and applicable site anchors at the site. Hence, server computers may be added and/or changed, and still the trustable data center specific information maintained.

As discussed, there may be several site anchors per data center. They can be associated with a specific customer or application of the cloud data center. In this case a customer representative may perform an audit of the data center and leave behind a site anchor as a marker that this particular data center is qualified to run services of this customer. The service application may check during its start-up procedure and at random times later that the physical server computer can access a corresponding site anchor. This check may be performed also by the platform, as a part of resource allocation scheduler. The Network Function Virtualization (NFV) block in this context can be, for example, to the management and orchestration (MANO) functionality and/or virtual infrastructure manager of the cloud service.

In the case that the hardware unit 550 is used, and the data center has already been audited by a customer representative, a new site anchor may be shipped to the site, provided hardware unit's 550 public key, which can be customer specific, is known. The site anchor can be configured so that it does not work in any other place than the nominated hardware unit 550.

It is also possible to create a special application software, which is launched in a trusted computer, to provision additional parameters to an installed site anchor remotely. With careful management of PKI keys and secrets this may not compromise trustworthiness of the site anchor.

Another possible solution may be to have a site anchor or slot array (i.e. the hardware unit 550) comprising a cellular communication module. The cellular communication module may comprise a build-in and certified cellular communication system transceiver together with antenna arrangement that makes the anchor visible to the cellular network. The cellular network may then attest the location of the anchor (e.g. by triangular measurement). By using tailored service of the cellular network, it is possible to have a fully automatic site anchor system which may not require human assessment when commissioned to use. This can be applied to mobile data centers, like those built into a sea container. Similarly, the satellite positioning circuitry 970 (e.g. Galileo's trusted positioning mode) may be used to determine the location of the site anchor 260. Satellite positioning and cellular positioning may be alternatives or complementary to each other. That is, using more than once location determination source, the trustworthiness of the location data may be further increased.

The advantage of the proposed solution may be that commercial server hardware (with TPMs) can be employed as such without modifications and still obtain a strong physical evidence of their run-time geographical location or site identification. Thus, for example, the applicable law for stored data may be known.

According to an embodiment, the apparatus 900 (e.g. the site anchor 260) is comprised in a Hardware Security Manager (HSM) device. The apparatus 900 may be considered an extension to existing HSM functionality—or—exist as an HSM-like device providing only site anchor functionality.

The setting up on a site anchor may be made in a number of (non-exclusive) ways.

Use of an auditor (human ostensibly) to set the initial parameters etc.

The use of learning mechanisms to discover the environment, e.g.: seismic properties, network properties, radio properties etc.

A combination of the above.

Furthermore, it may be possible to set the site anchor that all or a subset of properties are fixed and are unchangeable.

The configuration of site anchor would imply that some settings, configuration or even system would be signed using a mechanism that binds those with the auditor/certifier such that the person or system that configured the system could be traced in the event of the system being audited at a later point in time. Furthermore, this certification built into the system could be used to ascertain a level of trust in that system. One embodiment of this may be utilizing a TPM or similar devices (e.g.: HSM), or via remote attestation in some form or a combination of those technologies etc.

Figure 10:
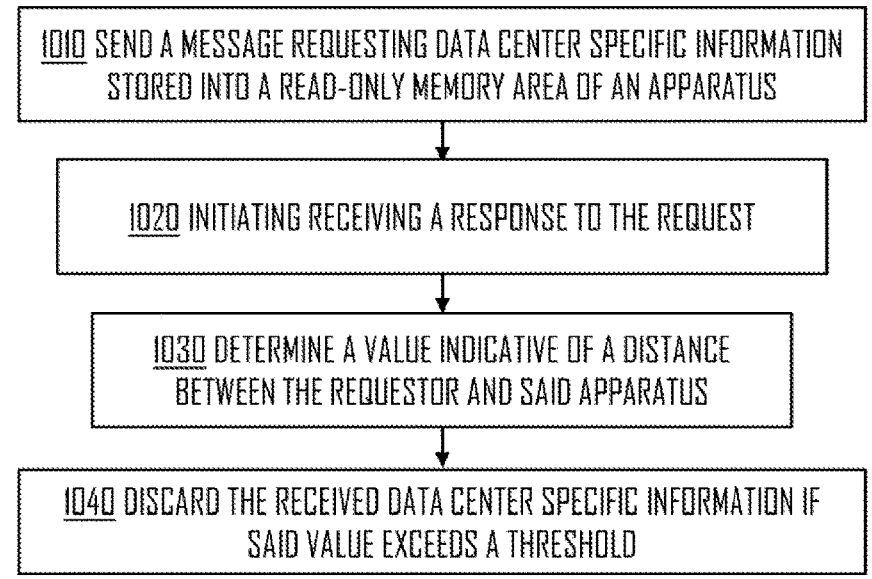
FIGS. 10 and 11 illustrate some embodiments.

FIG. 10 illustrates a method performed by a server computer according to an embodiment. The server computer may be, for example, the server computer 210. Referring to FIG. 10, the method comprises: sending, by the server computer of a data center, a request message to an apparatus of the data center, said message requesting data center specific information from a read-only memory area of said apparatus (block 1010); as a response to the sending, initiating receiving a response message from the apparatus (block 1020); in response to receiving the response message comprising the data center specific information, determining a value indicative of a distance between the server computer and the apparatus (block 1030); and discarding the received data center specific information if said value exceeds a threshold (block 1040). Said apparatus may be, for example, the site anchor 260. If said value does not exceed the threshold, the received information may be trusted and thus utilized in various ways.

Examples of different ways to determine distance between the server computer and the site anchor 260 were discussed above in more detail. These may include calculating RTT or using a wireless communication method having a limited range. According to an embodiment, said value is time, the method of FIG. 10 further comprising: determining a time between the transmitting the request message and the receiving the response message; and discarding the received data center specific information if the determined time exceeds the threshold. Thus, measuring time may provide one good option for determining the distance between the two devices. Sometimes said distance is referred to a communication distance, i.e. a distance that a data packet travels when first transmitted from one device to another and then back.

In an another example, said value comprises a received signal quality, the method further comprising: determining, based on the received response message, received signal quality; and discarding the received data center specific information if the determined received signal quality exceeds the threshold. Thus, the signal quality between the server computer 210 and the site anchor 260 may be determined. The signal quality may be measured using one or more indicators. For example, received signal strength indicator or received signal quality indicator may be measured and compared with the threshold. Exceeding in this case may mean that the signal quality exceeds a certain threshold such that it is below said threshold. Thus, it may be determined that the distance between the transmitter and the receiver is too long for the received data to be trusted. So, if the received signal quality is equal to or below a certain threshold, the received data may be discarded. In some embodiment, signal quality and time may both be used to determine whether the data is trusted or not. For example, if the time is below or equal to a first threshold and the signal quality is over or equal to a second threshold, the data may be trusted. The signal quality may be determined based on the response message from the site anchor 260, for example. Signal quality may comprise signal strength.

Figure 11:
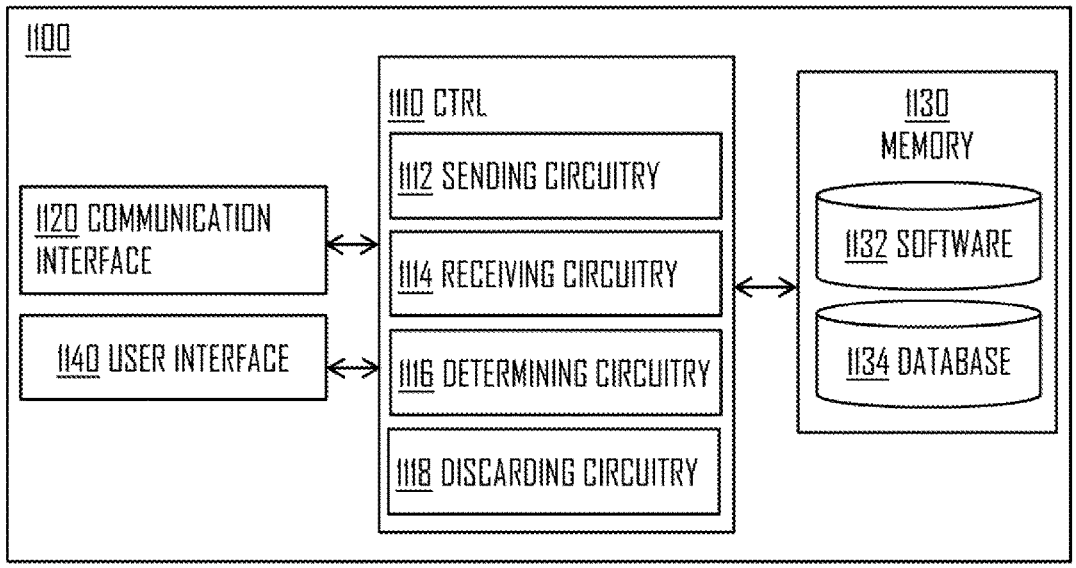

FIG. 11 illustrates a block diagram of an apparatus 1100 according to an embodiment. In an embodiment, the apparatus 1100 is or comprises the server computer 210, 220, 230, and/or 240. In an embodiment, the apparatus 1100 is configured to perform the steps of FIG. 10. Referring to FIG. 10, the apparatus 1100 may comprise a control circuitry (CTRL) 1110, such as at least one processor, and at least one memory 1130 including a computer program code (software) 1132, wherein the at least one memory and the computer program code (software) 1132 are configured, with the at least one processor, to cause the respective apparatus 1100 to carry out any one of the embodiments server computer (s) of FIGS. 1 to 8B and 10, or operations thereof.

Referring to FIG. 11, the memory 1130, may be implemented using any suitable data storage technology, such as semiconductor based memory devices, flash memory, magnetic memory devices and systems, optical memory devices and systems and fixed memory. The memory 1130 may comprise the software 1132. The memory 1130 may further comprise a database 1134 for storing data.

The apparatus 1100 may further comprise communication interface 1120 (also referred to as communication circuitry) comprising hardware and/or software for realizing communication connectivity according to one or more communication protocols. The communication circuitry 1120 may provide the apparatus with communication capabilities to communicate with the site anchor 260 and/or other site anchors, for example. The communication circuitry 1120 may comprise standard well-known components such as an amplifier, filter, frequency-converter, (de)modulator, and encoder/decoder circuitries and one or more antennas. For example, the communication interface 1120 comprises LAN circuitry, WLAN circuitry, and/or Bluetooth circuitry.

The apparatus 1100 may comprise a user interface 1140 comprising, for example, at least one keypad, a microphone, a touch display, a display, a speaker, etc. The user interface 1140 may be used to control the respective apparatus by a user of the apparatus 1100.

Referring to FIG. 11, according to an embodiment, the CTRL 1100 comprises a sending circuitry 1112 configured to perform operations of block 1010, a receiving circuitry 1114 configured to perform operations of block 1020, a determining circuitry 1116 configured to perform operations of block 1030 and a discarding circuitry 1118 configured to perform operations of block 1040.

According to an embodiment, the communication interface(s) 920, 1120 support Light Fidelity (Li-Fi) based communication. Hence, for example, communication between the site anchor 260 and the provisioning device may be at least partly based on Li-Fi. For example, in some embodiments of the invention utilizing wireless communication, said wireless communication may be at least partly based on Li-Fi or utilizes Li-Fi.

According to an example embodiment, the site anchor 260 is configured to operate in at least two different operating modes: setup mode and serving mode. In setup mode, the site anchor 260 may be configured by using, for example, the provisioning device 800. In serving mode, the site anchor 260 may receive requests from a plurality of server computers and respond to the requests according to the embodiments described herein.

According to an example embodiment, the provisioning device 800 comprises a console for setting values to the site anchor 260 when the site anchor 260 is in the setup mode. For example, the provisioning device 800 may be connected via wired (e.g. LAN) connection to the site anchor 260 at the data center site or at the factory. For this purpose, the site anchor 260 and the provisioning device 800 may include a wired interface, such as LAN interface. Additionally, the site anchor 260 and the provisioning device 800 may communicate with each other via wireless connection, such as WLAN.

The site anchor 260 may be in the setup mode before the one or more parameters are provisioned into the write-once memory of the site anchor 260. Once the one or more parameters are provisioned to the write-once memory, the memory may become read-only memory as described above. In an example embodiment, the site anchor 260 is configured to change operating mode from the setup mode to the serving mode in response to the provisioning the one or more parameters (e.g. once the parameters are provisioned).

In an embodiment, the site anchor 260 is configured to be reset. In response to the resetting, the site anchor 260 may be configured to change operating mode from the serving mode to the setup mode. That is, in setup mode the read-only memory of the site anchor 260 may once again become write-once memory, and one or more parameters may be provisioned to the site anchor 260 using the provisioning device 800. Again, once the new one or more parameters are provisioned, the site anchor 260 may return to serving mode in which it may respond to requests by transmitting location and/or data center specific information to the requesting server computer. According to an example embodiment, the site anchor 260 is configured to verify that the provisioning device 800 is valid for providing the one or more parameters to the site anchor 260. For example, being valid may in this case mean that the provisioner and/or the provisioning device 800 has sufficient rights to perform the provisioning of the one or more parameters. For example, one or more keys discussed above may be used for such verification. Additionally or alternatively, the provisioning device 800 may be configured to verify that the site anchor 260 is a correct site anchor to which the parameters need to be provisioned. That is, the verification may ensure that the parameters are provided into the correct (i.e. needed) site anchor 260 and not some other site anchor (e.g. wrong data center). As said, in one simple example, the verification is based on one or more keys or identifiers utilized in communication between the site anchor 260 and the provisioning device 800. In one example, the site anchor 260, in response to resetting (e.g. the memory), generates a unique identifier which is used in the verification. Based on the unique identifier, the provisioning device 800 may determine whether or not the site anchor 260 is the correct site anchor. Determining may be based on, for example, determining that the site anchor 260 is not some other site anchor.

Alternatively or additionally (i.e. to using one or more keys), the verification process may comprise determining a parameter indicative of distance between the site anchor 260 and the provisioning device 800. If the parameter indicates distance exceeding a threshold, the provisioning may be prevented. One example of such parameter may be RTT (Round Trip Time). Another example may be use of signal quality measurement. The determination of the parameter indicative of distance may be performed by the site anchor 260 and/or the provisioning device 800. For example, the site anchor 260 or the provisioning device 800 may transmit a message to the other, wherein the message comprises a time stamp generated by the transmitting entity. Said other may respond to the message by transmitting another message comprising a time stamp generated by the responding entity. The transmitting entity may then determine RTT based on the time stamps, and thus determine whether the distance between said entities (e.g. communicative distance or physical distance) exceeds a threshold. If it does, the provisioning by the provisioning device 800 may be prevented. E.g. the site anchor 260 may not accept the provisioned values and may so indicate to the provisioning device 800.

According to an example embodiment, the data center specific information stored and/or provisioned to the read-only memory area of the site anchor 260 uniquely identifies the data center to which the site anchor 260 is installed.

According to an example embodiment, the data center specific information stored and/or provisioned to the read-only memory area of the site anchor 260 comprises at least one of the following: country (i.e. country in which the data center is situated at) identifier and/or name, data center identifier and/or name, indication about a software license (i.e. indicates a permission to run or execute certain program(s) in the data center), data center owner identifier and/or name, geolocation specific data.

According to an example embodiment, verified provisioning device and/or verified site anchor refers to applying of trusted computing between the provisioning device and the site anchor. Trusted computing is explained in more detail above.

According to an example embodiment, the write-once memory area becomes or changes into read-only memory area once the data has been provisioned to said memory area. Said memory area may refer to a memory area provided on physical memory resources. This may mean that the actual physical memory may not necessarily have to be write-once and/or read-only memory, but a programmable memory that is configured via software to be write-once memory. Said software may further be configured to change the write-once memory area into read-only memory area upon and/or in response to providing the data into said write-once memory. So, according to an embodiment, a memory area of the site anchor is configured, using a software, to be write-once memory area, and configured, using a software, to be read-only memory area once the data has been provisioned. Hence, in some implementations, the actual used memory may be regular memory, and the solution may be provided using a combination of the regular memory and software.

As used in this application, the term 'circuitry' refers to all of the following: (a) hardware-only circuit implementations, such as implementations in only analog and/or digital circuitry, and (b) combinations of circuits and soft-ware (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

In an embodiment, at least some of the processes described in connection with FIGS. 1 to 8B and 10 may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments of FIGS. 1 to 8B and 10 or operations thereof.

According to yet another embodiment, the apparatus carrying out the embodiments comprises a circuitry including at least one processor and at least one memory including computer program code. When activated, the circuitry causes the apparatus to perform at least some of the functionalities according to any one of the embodiments of FIGS. 1 to 8B and 10, or operations thereof.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program or portions thereof. Embodiments of the methods described in connection with FIGS. 1 to 8B and 10 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium, for example. Coding of software for carrying out the embodiments as shown and described is well within the scope of a person of ordinary skill in the art. In an embodiment, a computer-readable medium comprises said computer program.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. A method comprising:
   receiving, by an apparatus of a data center, a request message from a server computer of said data center, the apparatus and the server computer being physically separate entities communicatively coupled with each other, said message requesting data center specific information stored in a memory area of the apparatus;
   initiating, by the apparatus, deciphering of the request message in response to receiving the request message; and
   as a response to successfully deciphering the request message, transmitting, by the apparatus, a response message to the server computer, said message comprising the data center specific information acquired from the memory area of the apparatus,
   the data center specific information comprising at least one of a jurisdiction identifier, a data center identifier uniquely identifying the data center, and pre-stored geolocation data, the data center specific information being stored in a read-only memory area of the apparatus, the read-only memory being a write once memory area before the data center specific information is stored in said memory,
   wherein the data center comprises a plurality of server computers each communicatively coupled with the apparatus, the apparatus configured to provide said data center specific information to each of the plurality of server computers, and
   wherein the apparatus comprises a smart card configured to be inserted into a corresponding receptacle of a hardware unit of the data center, the hardware unit comprising a plurality of receptacles for receiving smart cards.

2. The method of claim 1, further comprising:
   as a response to unsuccessfully deciphering the request message, transmitting a report message to a fault management entity, the report message indicating that the request message was unsuccessfully deciphered.

3. The method of claim 1, wherein the response message is ciphered utilizing a ciphering key before the transmitting the response message, and wherein the request message is deciphered using the same ciphering key.

4. The method of claim 1, wherein the apparatus is enclosed within a structure of the data center.

5. The method of claim 4, further comprising:
   preventing transmitting response messages in response to request messages if the apparatus is removed from the structure.

6. The method of claim 1, further comprising:
   after the smart card is inserted into said corresponding receptacle, receiving a message from said hardware unit;
   initiating deciphering of said message by using at least one deciphering key; and enabling, in response to successfully deciphering said message, transmitting response message to request messages requesting the data center specific information, or preventing, in response to unsuccessfully deciphering said message, transmitting response messages to said request messages.

7. The method of claim 1, further comprising:
preventing transmitting response messages in response to request messages if the apparatus is powered-up at least a predetermined number of time, wherein the predetermined number is at least two.

8. The method of claim 1, wherein the request message is received from a terminal device via the server computer, and wherein the response message is transmitted to the terminal device via the server computer.

9. The method of claim 1, further comprising:
receiving at least one configuration message from an external device, wherein the data center specific information is preset into the read-only memory according to the received at least one configuration message.

10. The method of claim 9, wherein the at least one configuration message is received utilizing wireless communication.

11. The method of claim 1, wherein the data center specific information comprises at least one parameter, each parameter settable only once.

12. The method of claim 11, further comprising:
receiving a configuration message from the external device associated with a certain parameter of the data center specific information;
determining whether or not said certain parameter has already been set; and
if said certain parameter has not yet been set, allowing setting said certain parameter according to the configuration message, or
if said certain parameter has already been set, preventing resetting said certain parameter.

13. A method comprising:
sending, by a server computer of a data center, a ciphered request message to an apparatus of the data center, said message requesting data center specific information from a memory area of said apparatus;
as a response to the sending, initiating receiving a response message from the apparatus;
in response to receiving the response message comprising the data center specific information, determining a round-trip time, based on the transmitting the request message and the receiving the response message, or determining received signal quality, based on the received response message, the data center specific information comprising at least one of a jurisdiction identifier, a data center identifier uniquely identifying the data center, and pre-stored geolocation data, the data center specific information being stored in a read-only memory area of the apparatus, the read-only memory being a write once memory area before the data center specific information is stored in said memory; and
discarding the received data center specific information if the determined round-trip time exceeds a threshold or if the determined received signal quality is equal to or below a threshold,
wherein the apparatus comprises a smart card configured to be inserted into a corresponding receptacle of a hardware unit of the data center, the hardware unit comprising a plurality of receptacles for receiving smart cards.

14. An apparatus comprising:
at least one processor; and
at least one memory comprising computer program code, wherein the at least one memory and the computer program code are configured, with the at least one processor, to cause the apparatus to perform operations comprising:
receiving a request message from a server computer of a data center, the apparatus and the server computer being physically separate entities communicatively coupled with each other, said message requesting data center specific information stored in a memory area of the apparatus;
initiating deciphering of the request message in response to receiving the request message; and
as a response to successfully deciphering the request message, transmitting a response message to the server computer, said message comprising the data center specific information acquired from the memory area of the apparatus,
the data center specific information comprising at least one of a jurisdiction identifier, a data center identifier uniquely identifying the data center, and pre-stored geolocation data, the data center specific information being stored in a read-only memory area of the apparatus, the read-only memory being a write once memory area before the data center specific information is stored in said memory,
wherein the data center comprises a plurality of server computers each communicatively coupled with the apparatus, the apparatus configured to provide said data center specific information to each of the plurality of server computers, and
wherein the apparatus comprises a smart card configured to be inserted into a corresponding receptacle of a hardware unit of the data center, the hardware unit comprising a plurality of receptacles for receiving smart cards.

15. The apparatus of claim 14, wherein the server computer of the data center performs operations comprising:
after the smart card is inserted into said corresponding receptacle, receiving a message from said hardware unit;
initiating deciphering of said message by using at least one deciphering key; and
enabling, in response to successfully deciphering said message, transmitting response message to request messages requesting the data center specific information, or
preventing, in response to unsuccessfully deciphering said message, transmitting response messages to said request messages.

16. An apparatus comprising:
at least one processor; and
at least one memory comprising computer program code, wherein the at least one memory and the computer program code are configured, with the at least one processor, to cause a server computer of a data center to perform operations comprising:
sending a ciphered request message to an apparatus of the data center, said message requesting data center specific information from a memory area of said apparatus;
as a response to the sending, initiating receiving a response message from the apparatus;

in response to receiving the response message comprising the data center specific information, determining a round-trip time, based on the transmitting the request message and the receiving the response message, or determining a received signal quality, based on the received response message, the data center specific information comprising at least one of a jurisdiction identifier, a data center identifier uniquely identifying the data center, and pre-stored geolocation data, the data center specific information being stored in a read-only memory area of the apparatus, the read-only memory being a write once memory area before the data center specific information is stored in said memory; and discarding the received data center specific information if the determined round-trip time exceeds a threshold or if the determined received signal quality is equal to or below a threshold, wherein the apparatus of the data center comprises a smart card configured to be inserted into a corresponding receptacle of a hardware unit of the data center, the hardware unit comprising a plurality of receptacles for receiving smart cards.

17. A data center system comprising:

at least one apparatus; and at least one server computer, said at least one apparatus and said at least one server computer being physically separate entities communicatively coupled with each other, wherein the at least one apparatus and the at least one server computer are configured to perform operations comprising:

sending, by the at least one server computer, a ciphered request message to the at least one apparatus, said message requesting data center specific information from a read-only memory area of said at least one apparatus;

receiving, by the at least one apparatus, the request message from the at least one server computer, said message requesting data center specific information stored into a read-only memory area of the at least one apparatus;

initiating, by the at least one apparatus, deciphering of the request message in response to receiving the request message;

as a response to successfully deciphering the request message, transmitting, by the at least one apparatus, a response message to the at least one server computer, said message comprising the data center specific information acquired from the read-only memory area of the at least one apparatus;

as a response to the sending, initiating, by the at least one server computer, receiving a response message from the at least one apparatus;

in response to receiving the response message comprising the data center specific information, determining, by the at least one server computer, a round-trip time, based on the transmitting the request message and the receiving the response message, or determining, by the at least one server computer, a received signal quality based on the received response message; and discarding, by the at least one server computer, the received data center specific information if the determined round-trip time exceeds a threshold or if the determined received signal quality is equal to or below a threshold, wherein the data center specific information comprises at least one of a jurisdiction identifier, a data center identifier uniquely identifying the data center, and pre-stored geolocation data, the data center specific information being stored in a read-only memory area of the apparatus, the read-only memory being a write once memory area before the data center specific information is stored in said memory, wherein the data center comprises a plurality of server computers each communicatively coupled with the apparatus, the apparatus configured to provide said data center specific information to each of the plurality of server computers, and wherein the apparatus comprises a smart card configured to be inserted into a corresponding receptacle of a hardware unit of the data center, the hardware unit comprising a plurality of receptacles for receiving smart cards.

* * * * *